(12) United States Patent
Diaz-Cuellar et al.

(10) Patent No.: US 11,695,650 B2
(45) Date of Patent: Jul. 4, 2023

(54) SECURE COUNT IN CLOUD COMPUTING NETWORKS

(71) Applicant: Microsoft Technology Licensing, LLC, Redmond, WA (US)

(72) Inventors: Gerardo Diaz-Cuellar, Woodinville, WA (US); Stefan Thom, Snohomish, WA (US); Joerg-Thomas Pfenning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 17/180,805

(22) Filed: Feb. 21, 2021

(65) Prior Publication Data
US 2021/0176141 A1    Jun. 10, 2021

Related U.S. Application Data

(62) Division of application No. 16/197,588, filed on Nov. 21, 2018, now Pat. No. 10,965,551.

(51) Int. Cl.
*G06F 15/16* (2006.01)
*H04L 41/5009* (2022.01)
(Continued)

(52) U.S. Cl.
CPC .......... *H04L 41/5016* (2013.01); *G06F 21/10* (2013.01); *G06F 21/57* (2013.01);
(Continued)

(58) Field of Classification Search
CPC . H04L 41/5016; H04L 9/0897; H04L 41/069; H04L 41/5032; H04L 41/5096;
(Continued)

(56) References Cited

U.S. PATENT DOCUMENTS 6,167,251 A * 12/2000 Segal ..................... G07F 7/0866
455/406
7,861,312 B2 * 12/2010 Lee .......................... G06F 21/10
713/168

(Continued)

OTHER PUBLICATIONS

Sarmenta et al., Virtual Monotonic Counters and Count-Limited Objects using a TPM without a Trusted OS, 2006. (Year: 2006).*
(Continued)

*Primary Examiner* — Hieu T Hoang
(74) *Attorney, Agent, or Firm* — Mark K. Young; Mayer & Williams, PC

(57) ABSTRACT

Inducements are provided to customers to regularly connect back to a service provider and report usage that is expressed using a count of requests from a local computing device for cloud-based operations such as packet routing, container instantiation, virtual machine (VM) utilization, calls to a service or application, and the like. The count information is reported within a secure context, such as a trusted execution environment (TEE), using public-private key pair cryptography by which key derivation is dependent on some form of counting. For example, a customer computing device that is subject to a usage license encrypts an operation count and reports it to the service provider.

20 Claims, 18 Drawing Sheets

(51) Int. Cl.
*G06F 21/10* (2013.01)
*G06F 21/57* (2013.01)
*H04L 9/08* (2006.01)
*H04L 41/069* (2022.01)
*H04L 41/50* (2022.01)

(52) U.S. Cl.
CPC .......... *H04L 9/0897* (2013.01); *H04L 41/069* (2013.01); *H04L 41/5032* (2013.01); *H04L 41/5096* (2013.01); *G06F 2221/0711* (2013.01); *G06F 2221/2149* (2013.01)

(58) Field of Classification Search
CPC .. G06F 21/10; G06F 21/57; G06F 2221/0711; G06F 2221/2149
See application file for complete search history.

(56) References Cited

U.S. PATENT DOCUMENTS

| | | | | |
|---|---|---|---|---|
| 8,966,568 | B2* | 2/2015 | Abendroth | H04L 63/104 726/4 |
| 9,767,317 | B1* | 9/2017 | Chakrovorthy | G06F 21/74 |
| 2005/0261058 | A1* | 11/2005 | Nguyen | G07F 17/3255 463/40 |
| 2006/0143446 | A1* | 6/2006 | Frank | H04L 9/3247 713/164 |
| 2007/0197282 | A1* | 8/2007 | Moshal | G07F 17/3269 463/29 |
| 2007/0198414 | A1* | 8/2007 | Derrenberger | H04L 9/065 705/51 |
| 2007/0266421 | A1* | 11/2007 | Vaidya | H04L 63/20 726/1 |
| 2008/0319779 | A1* | 12/2008 | Hughes | G06Q 99/00 705/310 |
| 2009/0067689 | A1* | 3/2009 | Porter | G06F 21/572 382/124 |
| 2009/0178138 | A1* | 7/2009 | Weiss | G06F 21/10 726/22 |
| 2009/0320110 | A1* | 12/2009 | Nicolson | H04L 9/3268 713/176 |
| 2010/0223656 | A1* | 9/2010 | Ray | H04L 9/3271 726/2 |
| 2010/0287363 | A1* | 11/2010 | Thorsen | G06F 9/4406 713/2 |
| 2012/0102313 | A1* | 4/2012 | Nicolson | H04L 63/123 713/2 |
| 2012/0151223 | A1* | 6/2012 | Conde Marques | G06F 21/6218 713/193 |
| 2015/0135300 | A1* | 5/2015 | Ford | G06Q 50/18 726/11 |
| 2016/0210596 | A1* | 7/2016 | Xu | G06Q 30/0207 |
| 2016/0252895 | A1* | 9/2016 | Case | G06Q 30/01 700/12 |
| 2016/0306966 | A1* | 10/2016 | Srivastava | H04L 9/30 |
| 2017/0010881 | A1* | 1/2017 | Kawazu | G06F 8/654 |
| 2017/0041296 | A1* | 2/2017 | Ford | G06F 21/64 |
| 2017/0346853 | A1* | 11/2017 | Wyatt | H04L 63/1425 |
| 2018/0189783 | A1* | 7/2018 | Flurscheim | G06Q 20/326 |
| 2019/0052456 | A1* | 2/2019 | Bygrave | H04L 9/3268 |
| 2019/0243630 | A1* | 8/2019 | England | G06F 21/554 |
| 2019/0319843 | A1* | 10/2019 | Telfer | H04L 63/10 |
| 2019/0334882 | A1* | 10/2019 | Mondello | H04L 9/0869 |
| 2019/0349426 | A1* | 11/2019 | Smith | H04L 45/20 |
| 2019/0370103 | A1* | 12/2019 | Letey | G06F 11/0772 |

OTHER PUBLICATIONS

"Office Action Issued in Indian Patent Application No. 202147022655", dated Dec. 28, 2022, 7 Pages.

* cited by examiner

SECURE COUNT IN CLOUD COMPUTING NETWORKS

CROSS-REFERENCE TO RELATED APPLICATIONS

This application is a divisional of U.S. patent application Ser. No. 16/197,588, filed Nov. 21, 2018, entitled "SECURE COUNT IN CLOUD COMPUTING NETWORKS", which is incorporated herein by reference in its entirety.

BACKGROUND

A cloud computing environment, also called a "cloud computing network," "distributed computing system," or simply a "cloud," typically provides processing and storage resources to local computing devices over a wide-area network, such as the Internet. The cloud computing network generally provides resources that are available on demand from shared pools of configurable computing resources such as networks, servers, storage devices, applications, and software services, and the offered resources can typically be rapidly provisioned and released with relatively small management effort from the users. Providers of services that are delivered over cloud-based computing networks may use software that is open source, or which is otherwise subject to disclosure to customers under terms of license agreements or applicable regulations and laws. Service providers want to avoid scenarios in which customers simply copy the software and use it in violation of license terms.

SUMMARY

Inducements are provided to customers to regularly connect their computing devices to a service provider and report usage that is expressed using a count of requests for cloud operations such as packet routing, container instantiation, virtual machine (VM) utilization, calls to a service or application, and the like. The count information is reported within a secure context, such as a trusted execution environment (TEE), using public-private key pair cryptography by which key derivation is dependent on some form of counting. For example, a customer computing device that is subject to a usage license encrypts an operation count and reports it to the service provider.

The service provider can decrypt the message from the computing device so the secure count serves as proof that the computing device is trusted and subject to the service provider's license terms. The proof of work in the reported secure count also enables the service provider to verify that the computing device is operating within the scope of its license or other applicable policies. For example, a monotonic count-up process may be utilized, and when the count exceeds some threshold, the service provider can disable certain functions for the computing device or enable the customer to obtain additional counts that the computing device may to use to continue operations under the license.

The secure counts may be utilized to implement a variety of licensing scenarios using, for example, count-up and count-down processes for pre-paid, post-paid, and other subscription-based models. Under a pre-paid license for example, a customer computing device can be loaded up with pre-paid counts. The computing device performs proof of work in encrypted messages that go back to the service provider to thereby count down on licensed operations. When the count goes to zero, the customer needs to obtain additional counts to continue to operate the computing device with the service provider's cloud computing platform.

The frequency at which counting is performed and provided to the service provider can vary by implementation, computing device type and number, service type, cloud computing network characteristics, applications, or the like. More frequent counting and reporting enables licensing to be implemented essentially on a real-time basis, while less frequent reporting may suit other scenarios such as volume licensing or annual licensing. Regardless of frequency, the count reporting is hardware-enforced by cryptographic processes in the context of a TEE and thus integrity of the reported count is ensured and thereby enables the service provider to detect inappropriate actions or platform misuse by bad actors.

The inducements for customer reporting can include both positive factors where the customer receives a benefit, and negative factors where platform functionality is reduced or disabled for local computing devices if the customer fails to connect back to the service provider. Illustrative examples of positive inducements include the provision of security updates, application patches, and enablement of additional computing device or platform functionalities using, for example, trusted plug-ins. Negative inducements may be implemented using hardware-based watchdogs that disable platform functionality for the computing device unless the customer reports back to the service provider on some agreed-upon basis. The service provider may require, for example, that a customer computing device connect to the service and provide a count as part of a regular integrity check of computing device runtime state. If the computing device does not connect back and provide the proof of work, then requested actions are disabled using the watchdog, as security of the computing device may be compromised.

In various illustrative examples, the present secure count provides for variable configurations to be implemented for trusted computing devices. Computing devices typically have a range of hardware capabilities which can be selectively enabled or disabled according to license terms. Service providers can build a single computing platform on which tailored customer solutions are configurable by allowing customers to pay for only the functionalities that are utilized.

Secure count may be utilized to throttle computing device operations and data transmission. The proof of work can be made arbitrarily lengthy and/or difficult to prevent the computing device from being co-opted by bad actors. In addition, as secure count operates within a TEE, a device can be effectively throttled during the secure count reporting by being "locked out" or disabled via applicable policy for selected periods of time.

Secure count may be utilized to manage exhaust of unstructured data from computing devices. By implementing cryptographic attestation through secure count, health certificates can be generated for all computing devices and data that is emitted from a given enterprise or domain. Such attestation enables filtering data by source and may also facilitate forensic analyses by tracking device state as the data is harvested.

Secure count can enable protections for private data and proprietary code. In systems using specialized local hardware, such as medical imaging devices at hospitals, certain private data cannot lawfully leave the local environment. Some image analysis code—which may be proprietary and not open source—thus typically needs to be run locally, while other data/code, such as training models used in artificial intelligence, can be stored and executed in the cloud. In the TEE implemented for secure count, the proprietary code can be encrypted and then run in a locally instantiated trusted plug-in. The code can be downloaded to the local device as part of the cryptographic message exchange in the reporting of the secure count in a trusted context.

Secure count may be used to verify event logging on a computing device or a group of devices. The secure counting may be performed monotonically, therefore there is an expected correspondence between the secure count and events that occur in a computing platform or environment, for example, such as transmission of outgoing messages. Discrepancies between the secure count and message logging can be analyzed to ensure integrity of a computing device and enhance security for the cloud service. For example, a mismatch between the monotonic counter and message log can raise a red flag to a system administrator.

Utilization of secure count enables providers to effectively manage cloud services for customers and the underlying computing platforms and network infrastructure on which the services operate. Security of the services is improved because the provider can readily detect connection attempts by unauthorized and malicious actors who cannot provide the proof of work in the secure count. The cloud-based service provider is also enabled by the secure count to monitor compliance with licensing agreements and policies that are applicable to computing devices that use the services. Efficiently implemented policy enforcement benefits customers by reducing security vulnerabilities and protecting resources from vulnerable or non-compliant computing devices. In addition, damaged or improperly operating computing devices can be detected using secure count so that they can be repaired or taken out of service to preserve data integrity.

Secure count also enables cloud-based service providers to track licensed and usage-based services so that resources and services are properly configured to meet demand with improved reliability and availability. Secure count also gives service providers opportunities to bring non-compliant computing devices back into licensed operations by offering license renewals or up-selling new features and services. Cloud-based service providers can also provide tailored solutions This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
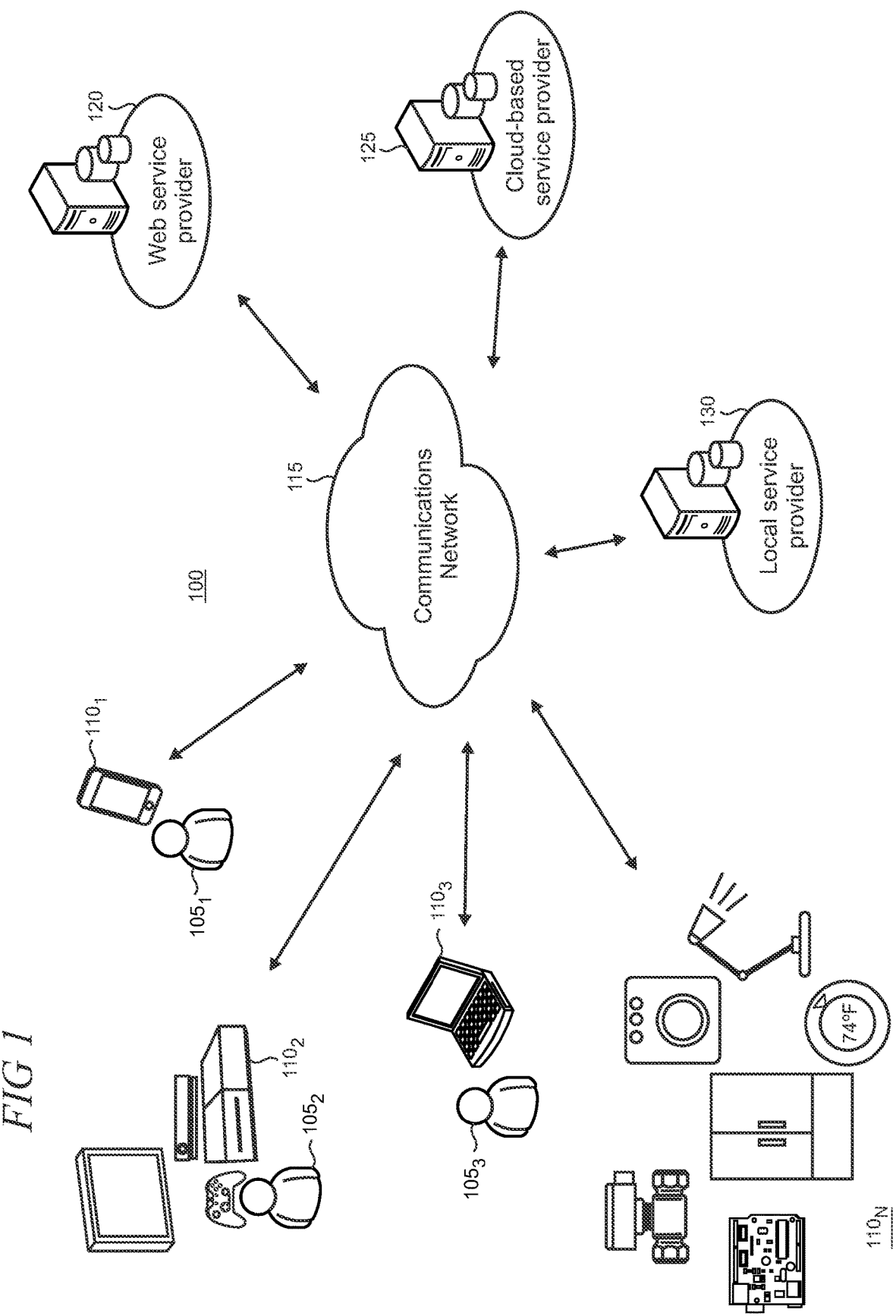
FIG. 1 shows an illustrative computing environment in which various computing devices interact with services over a communications network.

FIG. 1 shows an illustrative computing environment 100 in which the same or different customers and/or users 105 may employ various computing devices 110 that communicate over a communications network 115 to access services, applications, and data that are supported by one or more of providers of local services 130, cloud-based services 125, and web services 120. The computing devices may utilize locally-implemented operations and/or data storage or remotely-implemented operations and/or data storage, either alone, in combination with other computing devices, or in combination with the services. The computing devices can be utilized by individual users 105 or be organized as part of an enterprise in which the users are members or employees of the enterprise. Some computing devices may be part of a larger enterprise, device, or machine, or be utilized in a process or operation. For example, computing devices can be used throughout a manufacturing facility or in an industrial process. Some computing devices can be operated by other devices, systems, and processes, and/or are not necessarily directly controlled by a user.

The computing devices 110 can support two-way communications and data-consuming applications such as web browsing and multimedia (e.g., music, video, etc.) consumption in addition to various other features. The computing devices may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices may also be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), smart speakers, IoT (Internet of Things) devices, smart appliances, connected car devices, smart home hubs and controllers, desktop computers, multimedia consoles, gaming systems, or the like. IoT devices can include household devices such as appliances as well as industrial devices such as sensors, valves, actuators, machines, and the like. In the discussion that follows, the use of the term "computing device" is intended to cover all devices that perform some computing operations, whether they be implemented locally, remotely, or by a combination of local and remote storage.

The various computing devices 110 in the environment 100 can support different features, functionalities, and capabilities. Some of the features supported on a given computing device can be like those supported on others, while other features may be unique to a given computing device. The degree of overlap and/or distinctiveness among features supported on the various computing devices can vary by implementation. For example, some computing devices can support touch controls, gesture recognition, and voice commands, while others may enable a more limited user interface, or may provide no user interface at all. Some computing devices may support video consumption and Internet browsing, while other computing devices may support more limited media handling and network interface features.

The computing devices 110 can typically utilize the communications network 115 to access and/or implement various functionalities. The network can include any of a variety of network types and network infrastructure in various combinations or sub-combinations including local-area networks (LANs), wide-area networks (WANs), cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The communications network 115 may utilize portions of the Internet (not shown) or include interfaces that support a connection to the Internet so that the computing devices 110 can access data or content and/or render user experiences provided by various remote or cloud-based services 125 and web services 120. The cloud-based services 125 and web services 120 can support a diversity of features, services, and/or user experiences.

Figure 2:
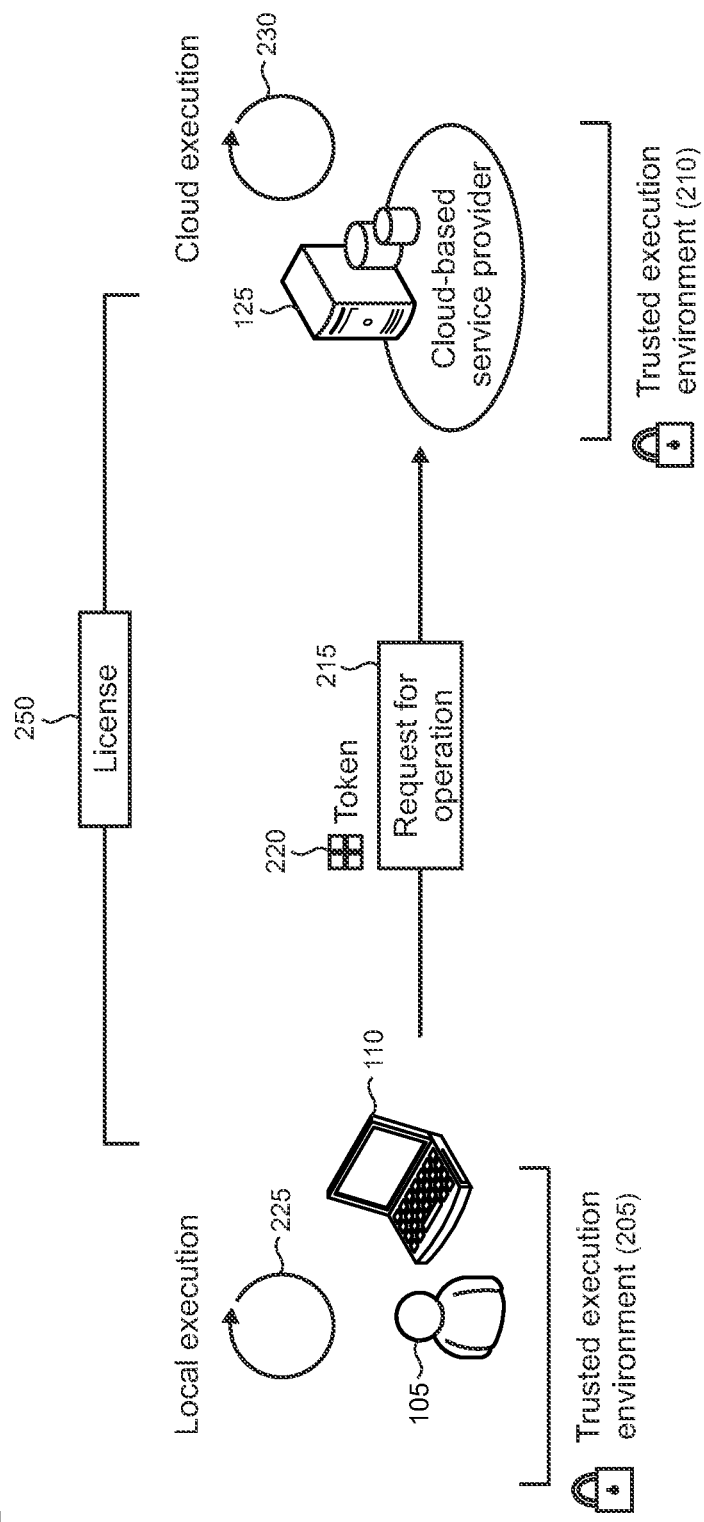
FIGS. 2 and 3 show an illustrative computing device and cloud-based service provider that operate in a trusted execution environment (TEE)
Figure 3:
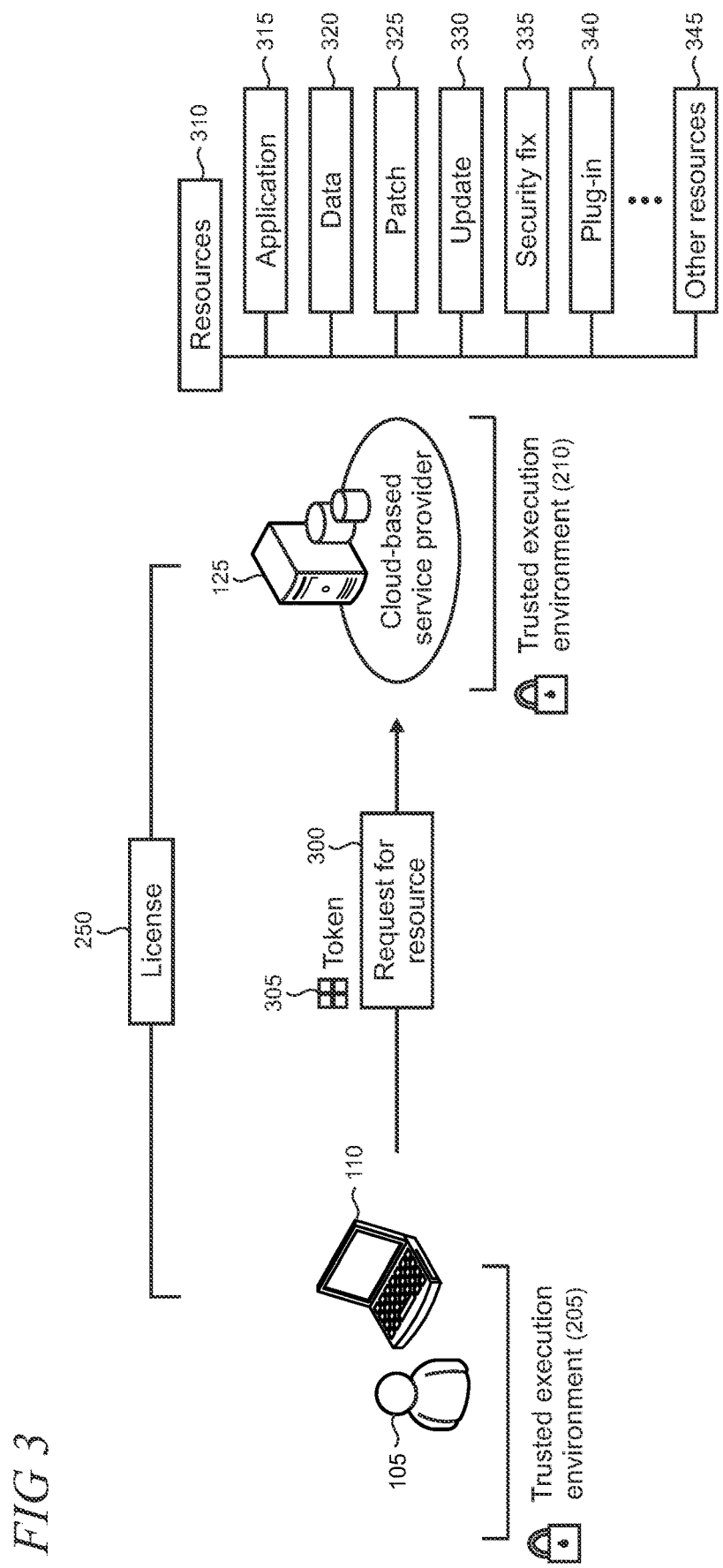

FIGS. 2 and 3 show an illustrative computing device 110 and cloud-based service provider 125 that operate in respective trusted execution environments (TEEs) 205 and 210. TEEs are typically configured to provide an isolated area of hardware (or software in some implementations) that ensures data is stored, processed, and protected with respect to confidentiality and integrity within a context of trust. Illustrative implementations of TEEs are described below in the text accompanying FIGS. 15 and 16. In this illustrative example, the computing device interoperates with the service provider under the terms of a license 250, policy, or other agreement (collectively referred to as "license") that covers various operations that may be performed, for example, to implement some functionality or feature. An exemplary license may cover IoT devices in a factory connecting to an IoT solution to report telemetry data on an hourly basis over some time period. The telemetry data may be stored in the cloud by the service provider and analyzed using artificial intelligence to verify that the factory processes are operating within acceptable design limits.

As shown in FIG. 2, a computing device 110 can make a request 215 for an operation to the cloud-based service provider 125. A token 220 can be presented with the request or can express the request in those implementations in which token-based access is utilized by the service provider to authenticate the computing device as trusted. The requested operation can include, for example and without limitation, packet routing, container instantiation, virtual machine (VM) utilization, calls to a service or application, and the like. A given requested operation can involve local execution of code, application, or a process (as indicated by reference numeral 225), remote execution 230, or a combination of local and remote execution.

As shown in FIG. 3, an operations request can include a request 300 to access one or more trusted resources 310 that are supported by the cloud-based service provider. As with the operations request, a resource request may use, or be expressed using an access token 305. Without limitation, resources can illustratively include an application 315, data 320, patch 325, update 330, security fix 335, plug-in 340, or some other resource 345. In some cases, fulfillment of the resource request can include the computing device downloading code and/or data from the service provider that may be operated upon locally. In other cases, resource fulfillment may involve remote code execution or a combination of local and remote code execution.

The categories of operations and resources can be defined to provide for some overlap in some implementations. Thus, for example, a request for a resource by the computing device may involve performance of some operation, and vice versa. For both requests for operations and requests for resources, the cloud-based service provider 125 is typically motivated to ensure that the computing device 110 is behaving within the bounds of the license 250. This may be accomplished by the computing device 110 connecting back to the service provider 125 to report a count of requests for operations and resources.

Figure 4:
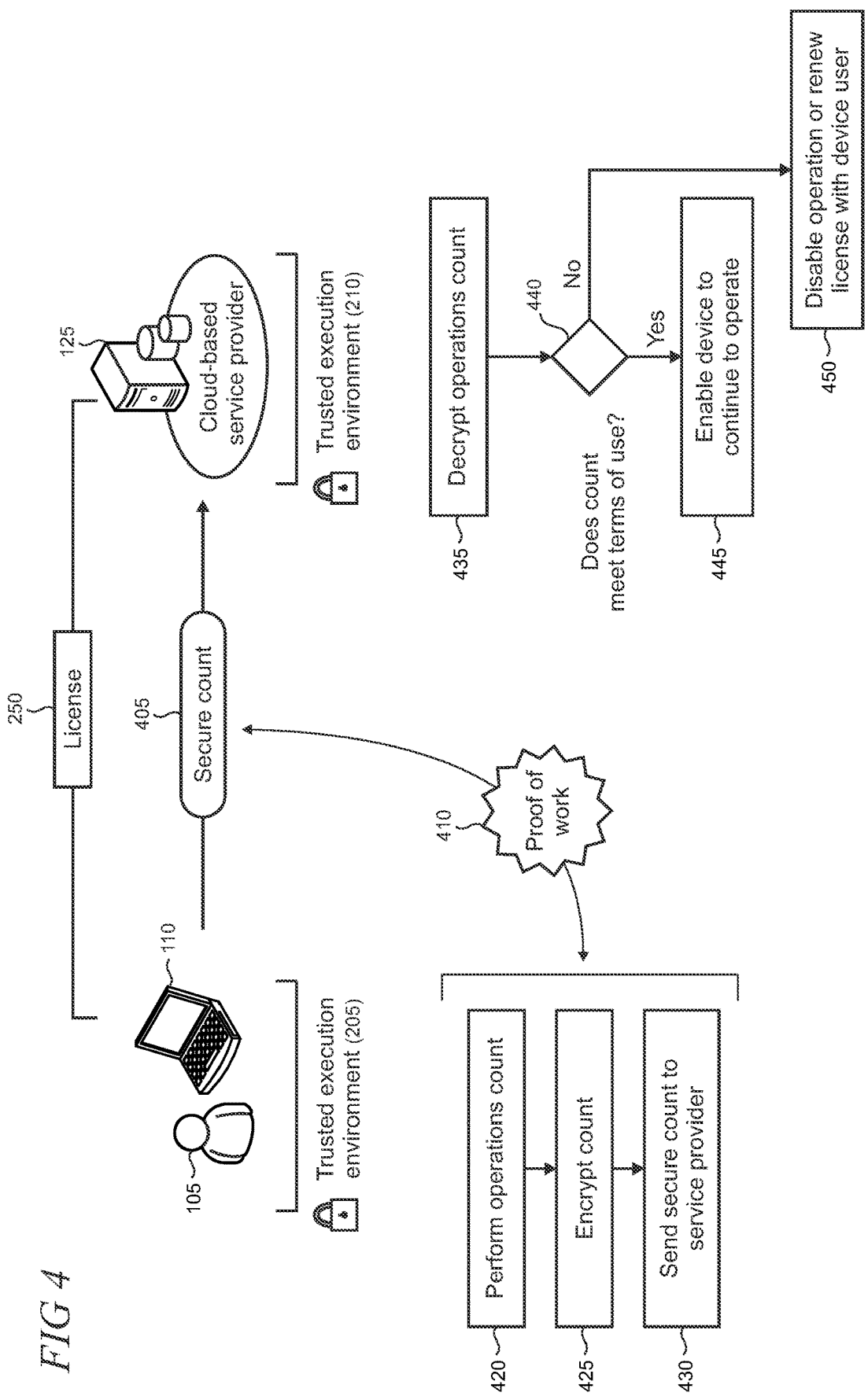
FIG. 4 shows an illustrative computing device that provides proof of work in the form of a secure count to a cloud-based service provider.

As shown in FIG. 4, the computing device 110 performs an operations count, as shown in block 420, and encrypts the count in block 425. The encryption may be performed using public-key cryptography (also referred to as asymmetric cryptography) in which a secret private key is used by the computing device and a public key is shared with the cloud-based service provider 125. The public key and the private key are mathematically linked. Data that is encrypted with the public key can be decrypted only with the private key, and data that is signed with the private key can be verified only with the public key. In TEE implementations using a trusted platform module (TPM) or other embedded hardware technologies, a computing device can create cryptographic keys and encrypt them so that they can only be decrypted by the TPM.

Within the trusted context supported by the TEEs 205 and 210, the secure count 405 operates as proof of work 410 by the requesting computing device 110 when it is sent to the cloud-based service provider 125 in block 430. Because the cloud-based service provider can decrypt the secure count at block 435, it can confirm the identity of the computing device as being covered by the license 250. The secure count also provides a measure of consumption of the provider's services by the computing device. Thus, at decision block 440, the service provider can determine if the reported secure count meets the applicable terms of the license 250. If the count indicates that the computing device is in compliance with the license terms, then the cloud-based service provider may enable the computing device to continue to operate under the existing license terms at block 445. However, if the count indicates that the computing device is out of compliance, then at block 450, operations are disabled, or the license may be renewed or replaced so that the device can continue to operate.

Customers of the cloud-based service provider 125 are encouraged to configure their computing devices 110 to connect back to the provider with the secure count 405 using a system that may comprise positive or negative inducements, or both. The positive inducements may comprise the cloud-based service provider making resources such as patches, updates, and plug-ins available to a computing device. Negative inducements are those that discourage non-compliance with applicable license terms and policies. For example, functionalities may be selectively disabled in the cloud, in the computing device, or in both locations when the secure count indicates that the computing device has reached an operational limit as defined by the license or policies.

Figure 5:
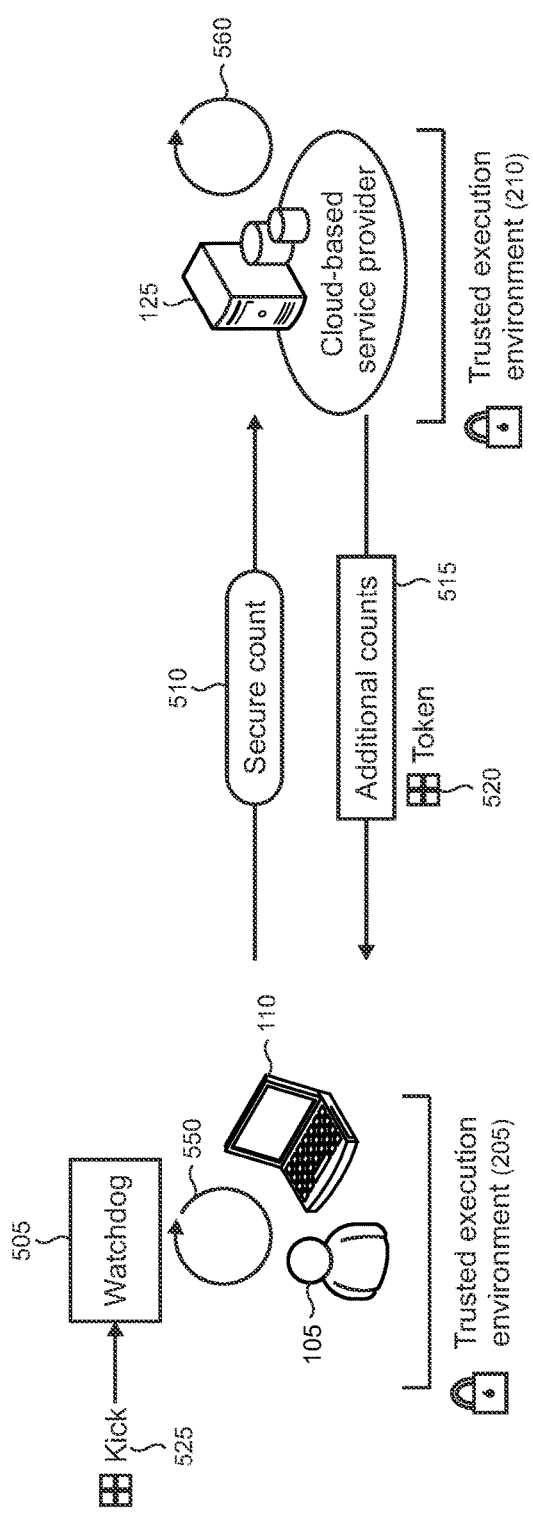
FIGS. 5 and 6 show an illustrative watchdog that operates on a computing device.
Figure 6:
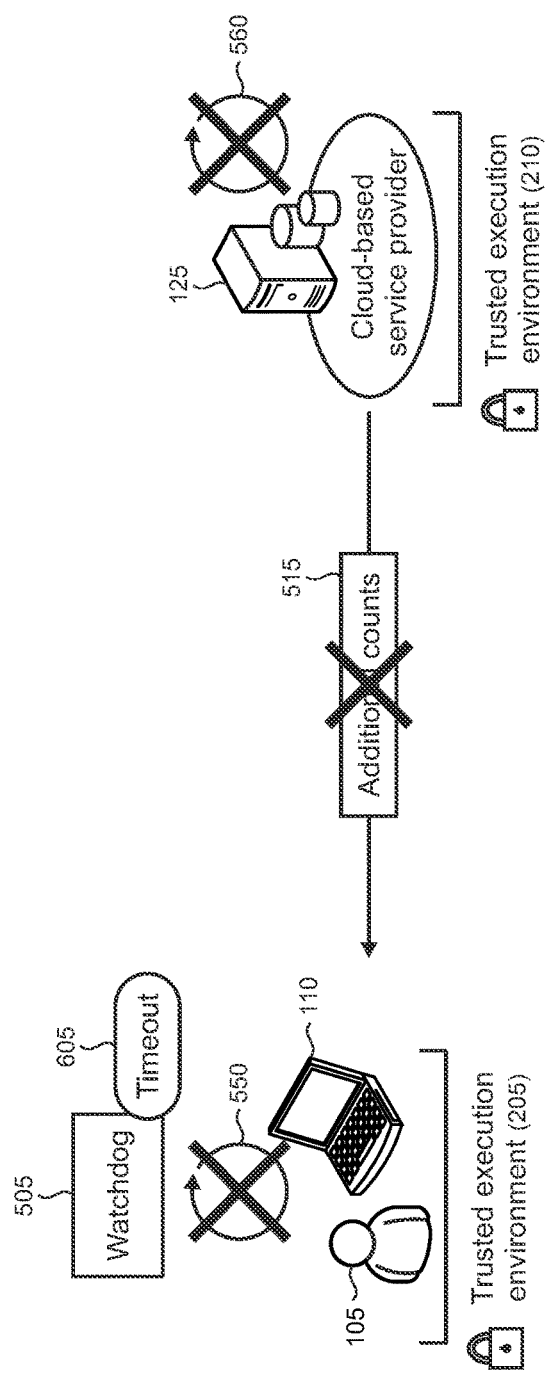

FIGS. 5 and 6 show an illustrative watchdog 505 that operates on a computing device 110 that may be utilized to implement selective disablement of functionality. In FIG. 5, the device reports a secure count 510 to the cloud-based service provider 125. If the secure count indicates that the computing device is operating within license terms or policies, then the provider can respond with additional counts 515 to enable the computing device to continue to perform operations such as executing code, transmitting and receiving data, and the like. The additional counts can be expressed, for example, using a token 520 or other suitable element that may be used to kick the watchdog, as indicated by reference numeral 525. The kick 525 enables the device to continue licensed operations that may be performed locally and/or remotely, as respectively indicated by reference numerals 550 and 560.

As shown in FIG. 6, if the watchdog 505 is not kicked by the provision of additional counts, then it will implement a timeout 605 on the computing device 110. The timeout works to disable functionality on the computing device so that operations outside the applicable license terms or policies are prevented. The disablement can occur at both the local computing device and remote cloud operations at the service provider 125. The watchdog can also be referred to as a "watchdog timer" or a "dead man switch." In the TEE, the watchdog is a trusted element that may be implemented using hardware, software, firmware, or combinations thereof that are configured to perform selective disablement of device functionality unless suitable proof of work is supplied to the cloud-based service provider.

When the computing device 110 renews the license to obtain additional counts, or otherwise provides proof of work to demonstrate compliance with applicable license terms or policies, the watchdog 505 can remove the timeout. Computing device functionality can thus be selectively enabled. The frequency at which the computing device connects back to the service provider 125 can vary by implementation. In some scenarios, a token may have a short life, and thus represent a small number of additional counts. The computing device would therefore need to report back to the service provider on a frequent basis to provide the secure count and receive additional counts in exchange. Such frequent connections may be useful, for example, in scenarios where the service demands are highly dynamic and load-balancing across resources may be performed more effectively with frequent or real-time reporting.

Other scenarios may utilize less frequent reporting of the secure count where a timer on the watchdog 505 is set for relatively long durations. For example, some computing devices may have relatively low utilization or be subject to liberal license terms and policies. In some cases, the secure count may be helpful to the service provider for purposes beyond license and policy enforcement such as application and service development, network infrastructure maintenance and deployment, and other areas where utilization data from customers can be of benefit. A computing device may fall under a bulk or volume license for a customer's enterprise, for example, that is renewed yearly. Even so, the cloud-based service provider 125 still provides inducements for the computing device to connect back as a trusted device because the reported secure count can operate as attestation for a range of purposes, as described below.

Figure 7:
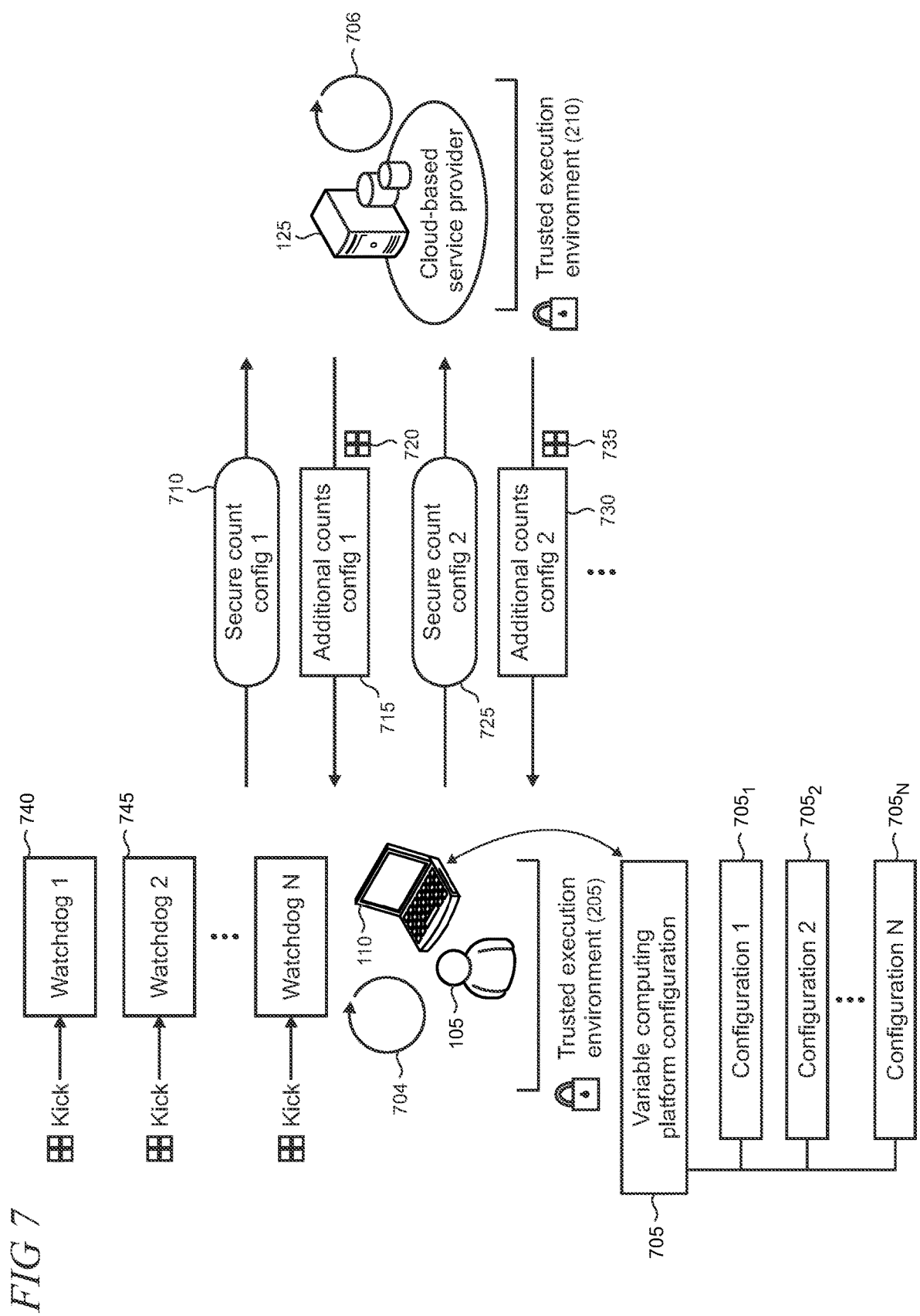
FIG. 7 shows an illustrative implementation of secure count to support variable configurations of a computing device.

The present secure count in cloud computing networks can be utilized in a variety of scenarios and applications as described below in the text accompanying FIGS. 7-12. FIG. 7 shows an illustrative implementation of secure count to support variable configuration of a computing device 110. The computing device includes hardware and software that may be utilized to support variable computing platform configuration, as shown by reference numerals $705_{1 \ldots N}$. For example, the device may be used for video editing using local and remote specialized video capture and processing hardware in one configuration, and data mining and analysis using a remote neural network in another configuration. In each configuration, the computing device may utilize local or remote operations, or a combination thereof, as indicated by reference numerals 704 and 706.

While in the first video editing configuration, the computing device 110 may report a secure count 710 of operations to the cloud-based service provider 125. The service provider can return additional counts 715 or tokens 720 in response to the reported count. Similarly, when the computing device is in the second configuration, it can connect back to the service provider to report a secure count 725 of operations associated with data mining and analysis. In response, the service provider can send additional counts 730 or tokens 735 to the device.

The computing device 110 can use the tokens returned by the cloud-based service provider to kick the respective watchdogs 740 and 745 to enable continued operations in either or both configurations. As noted above, if a watchdog is not kicked, it will issue a timeout to selectively disable some device functionality. For example, if the secure count for the first configuration indicates that the device has used up its current allotment of counts, the watchdog time implements a timeout to prevent the device from continuing to perform the video editing. The functionality can be re-enabled when additional counts are obtained, for example, by renewing the applicable license.

The secure count enables customers to pay for the functionality that they are using at a time of their choosing. In some scenarios, the functionality can be enabled and disabled on demand to provide customers with flexible and customizable solutions. In other scenarios, a license can be "floating" and thus be applied to different computing devices at different times. Thus, for example, a video editor using a first computing device can work on a project on one day. Another editor can continue to work on the project using a different computing device on the next day.

Figure 8:
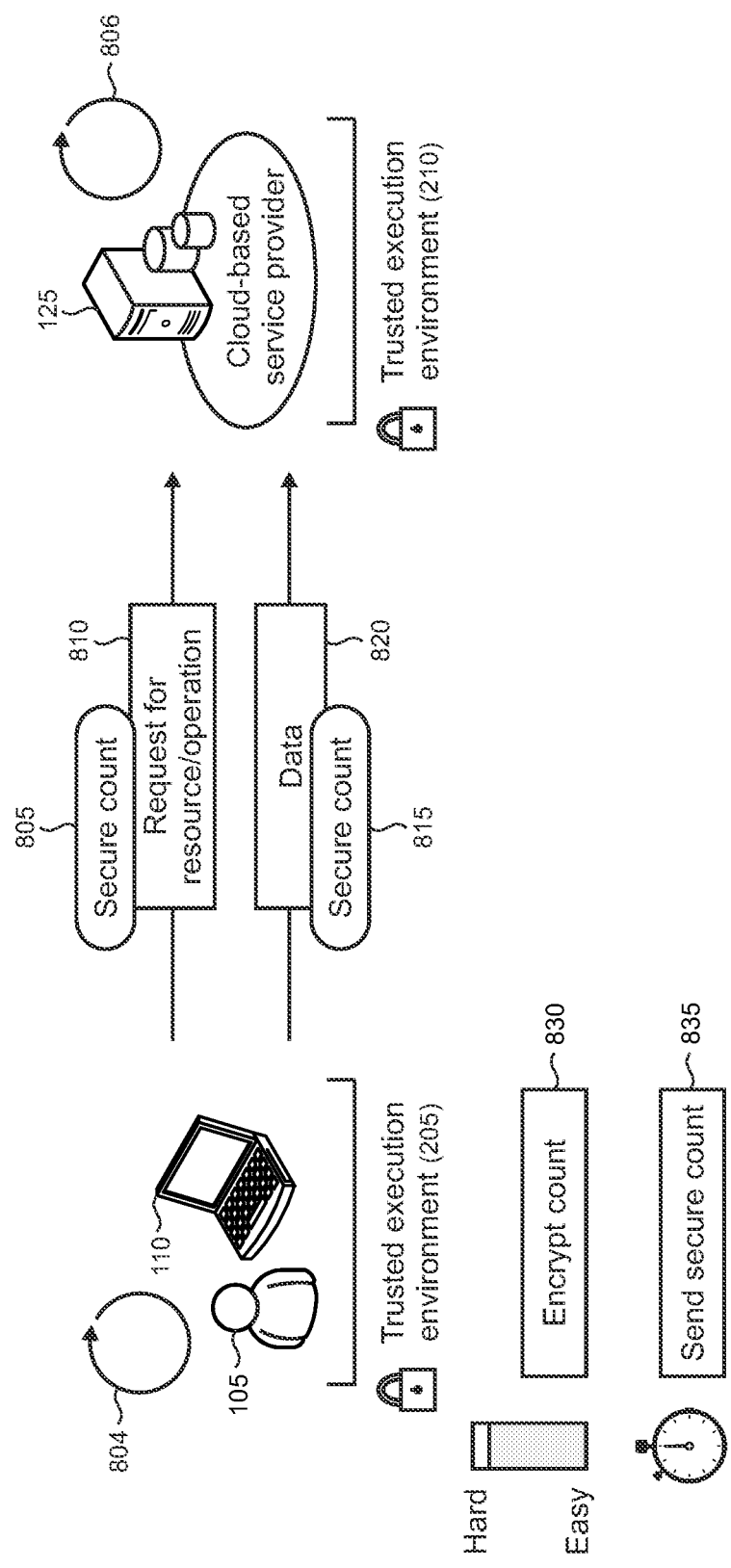
FIG. 8 shows an illustrative implementation of secure count to provide for operation and/or data throttling of a computing device.

FIG. 8 shows an illustrative implementation of secure count to provide for operation and/or data throttling of a computing device 110. The computing device can attach a secure count 805 of operations (as indicated by reference numerals 804 and 806) to each request 810 to the cloud-based service provider 125 for an operation or a resource. Operations can involve local and remote execution and processing, or combinations thereof, as indicated by reference numerals 804 and 806. A secure count 815 can also be reported when the computing device sends data 820 to the cloud-based service provider. The transmissions of requests and data can be throttled by making the encryption process underlying the secure count arbitrarily difficult, as shown by reference numeral 830. Alternatively, or in addition to making the encryption arbitrarily difficult, the sending of the secure count can also be implemented on a time-restricted basis in which the computing device transmits to the service provider after waiting for some prescribed time interval, as shown by reference numeral 835. The waiting period may be implemented and enforced using a trusted process and/or trusted time source in the TEE.

Imposing throttling on requests and data can enable customers 105 and the cloud-based service provider 125 to effectively manage resources. The customer may have computing devices that operate in an environment where resources may be scarce and/or expensive. For example, an IoT device may be battery powered and connected to the service provider using a radio link to supply telemetry data. By limiting instances in which the radio transmitter is activated, battery power can be preserved. The service provider can rely on the secure count as evidence that the computing device is adhering to agreed-upon reporting times. The throttling enables the service provider to deploy resources based on known and predictable traffic patterns. Data traffic that is outside the predicted pattern can indicate to the service provider that the computing device may be malfunctioning or have been compromised by a malicious actor.

Figure 9:
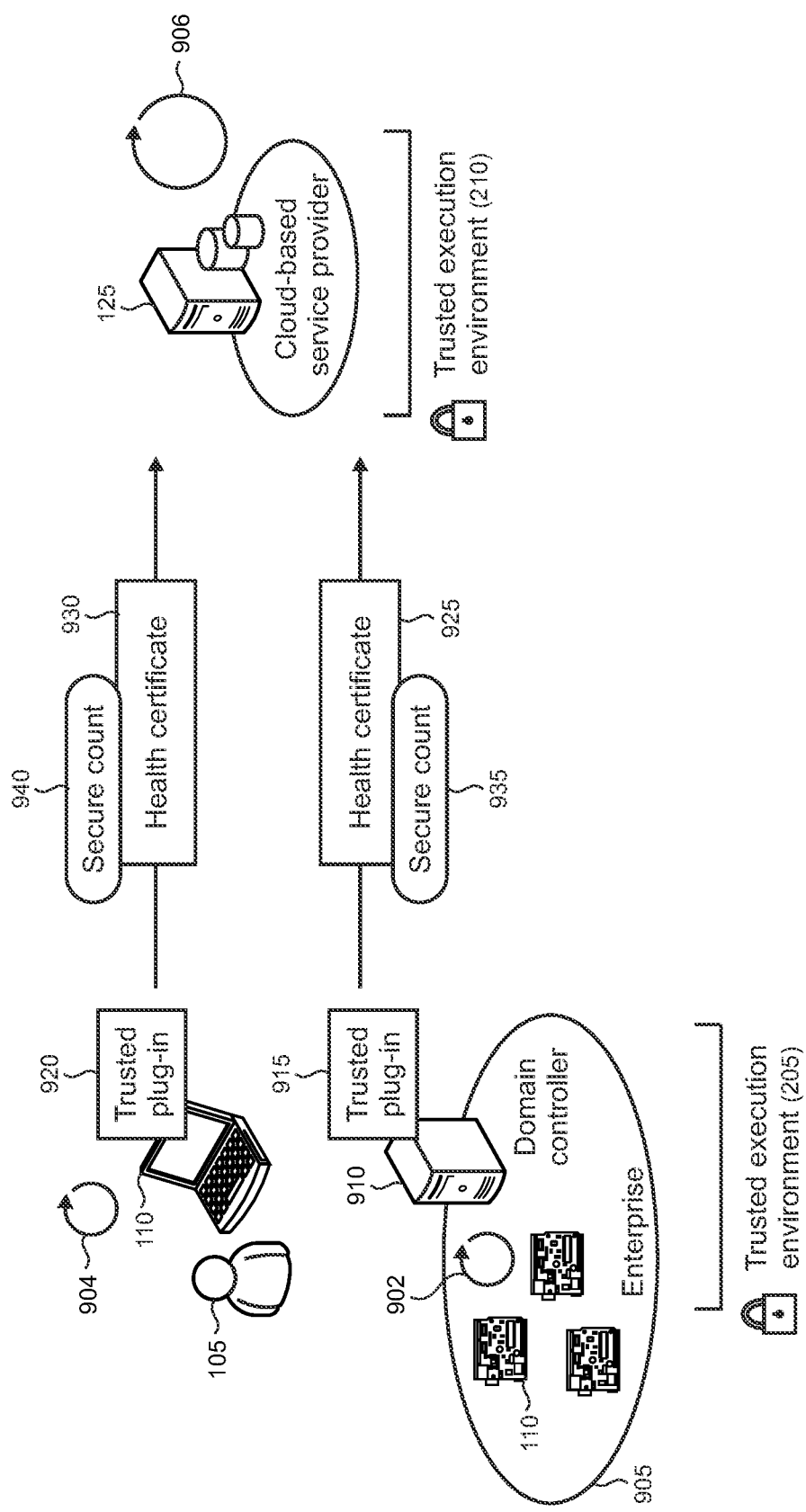
FIG. 9 shows an illustrative implementation of secure count to provide for data exhaust management for computing devices.

FIG. 9 shows an illustrative implementation of secure count to provide for data exhaust management for a single device or a group of computing devices 110. In this illustrative example, a group of computing devices such as IoT devices are deployed as part of an enterprise 905. The computing devices in the enterprise can be associated with or managed by a common domain controller 910 or another suitable device. The computing devices can be physically co-located or diversely located. The computing device 110 and domain controller each use an instance of a trusted plug-in, 915 and 920, that is configured to provide heath certificates, 925 and 930, for the respective device or group of computing devices. As shown, the heath certificates accompany the secure counts 935 and 940 of operations (as indicated be reference numerals 902, 904, and 906) but may be transmitted separately to the cloud-based service provider 125 in some implementations. Certificates can also be provided for emitted data or batches of emitted data and may be transmitted along with data emissions or provided with requests for operations and/or resources.

Each trusted plug-in 915 and 920 monitors the respective computing device or group of devices 110 to issue the certificates 925 and 930 that provide attestation of device heath. For example, the certificates can attest that a computing device was booted with trusted code through verification of the digital signatures of the components that were loaded at start-up. Alternatively, a trusted plug-in can review boot logs and other audit trails created by hardware-based TPMs, or similar components that may be used to implement a TEE, to confirm that the device started using code and/or data that is protected by the TPM.

Each certificate 925 and 930 can also include records of computing device state and other metadata or information that may facilitate analyses of computing device and/or data exhaust. In cases where the data exhaust includes unstructured data, the cloud-based service provider can utilize the health certificates to filter data by source. For example, if the cloud-based service provider 125 supports an artificial intelligence system that analyzes temperature data in a factory process, metadata may be analyzed to determine the state of an IoT temperature sensor at the time the data was harvested. If the device state indicates faulty operation outside accepted parameters, the data exhaust from that sensor can be ignored. Such filtering can be useful to remove noise that would otherwise be injected in the system which could make system outputs less accurate or reliable.

The trusted plug-ins 915 and 920 are examples of trusted components that the cloud-based service provider 125 can make available as resources 310 (FIG. 3) within a given TEE. Trusted plug-ins may also be supported from third party providers that can issue certificates to attest that the code that runs in the plug-in can be trusted. The trusted plug-ins are typically configured to work independently from the computing device operating system and can provide a variety of different functionalities to meet particular implementation requirements. For example, different trusted plug-ins can variously perform operations, implement features and functions, perform monitoring and reporting, enforce policies, implement and operate a TEE through key management and escrow services, and the like. Each type of trusted plug-in is arranged to report back to the service provider using a cryptographic attestation process to thereby operate within the context of the TEE.

Figure 10:
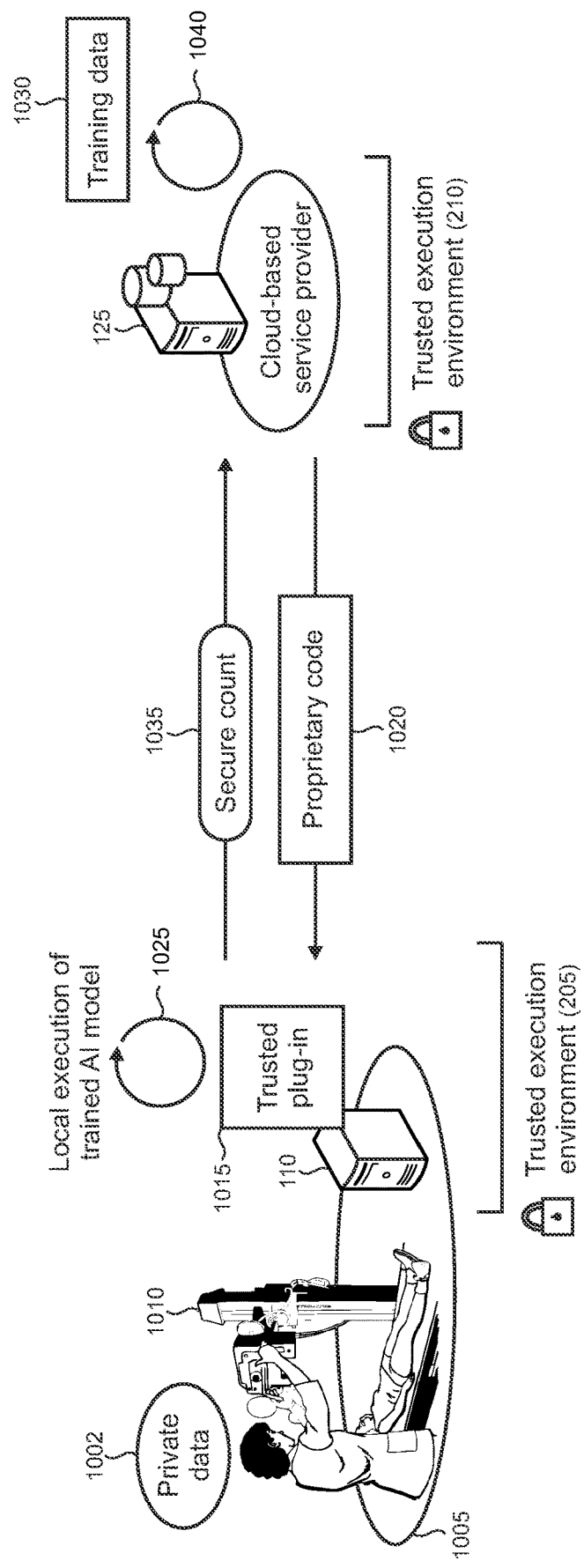
FIG. 10 shows an illustrative implementation of secure count to provide for protection of private data.

FIG. 10 shows an illustrative implementation of secure count to provide for protection of private data. For example, private medical imaging data 1002 may be generated at a medical imaging facility 1005 using a computing device 110 with specialized imaging hardware 1010 and a trusted plug-in 1015. The private data may be restricted from leaving the boundaries of the facility by operation of law or agreement covering patient privacy. To protect its interest in the proprietary artificial intelligence model that is used to analyze the data, the cloud-based service provider 125 can provide proprietary code 1020 that can locally execute in the trusted plug-in 1015, as indicated by reference numeral 1025. Training data 1030 may be remotely utilized at the service provider 125, in some implementations, to train the artificial intelligence model used in the local medical imaging.

The trusted plug-in 1015 can connect back to the cloud-based service provider 125 to provide a secure count 1035 of operations. The operations may include local operations associated with the proprietary code execution. Remote operations 1040 at the service provider may also be utilized and counted in some cases if those operations do not involve the private data 1002. The proprietary code 1020 is downloaded by the computing device 110 in encrypted form which the trusted plug-in can decrypt prior to execution. In alternative implementations in which the computing device 110 operates as an open platform, the proprietary code can be transmitted to the computing device 110 in the clear. However, the code will only execute within the controlled environment of the TEE on the trusted plug-in.

Use of the trusted plug-in 1015 in the TEE on the computing device 110 to execute medical imaging using the trained artificial intelligence model enables the patient's private data 1002 to remain local at the facility 1005 while simultaneously enabling the cloud-based service provider 125 to protect its proprietary code. In addition, the secure count 1035 enables the service provider to enforce license terms and policies that may be applicable to the local utilization of the code. For example, the trusted plug-in 1015 may receive a token from the service provider when the secure count is within license limits that the plug-in can use to kick a watchdog, as previously described.

Figure 11:
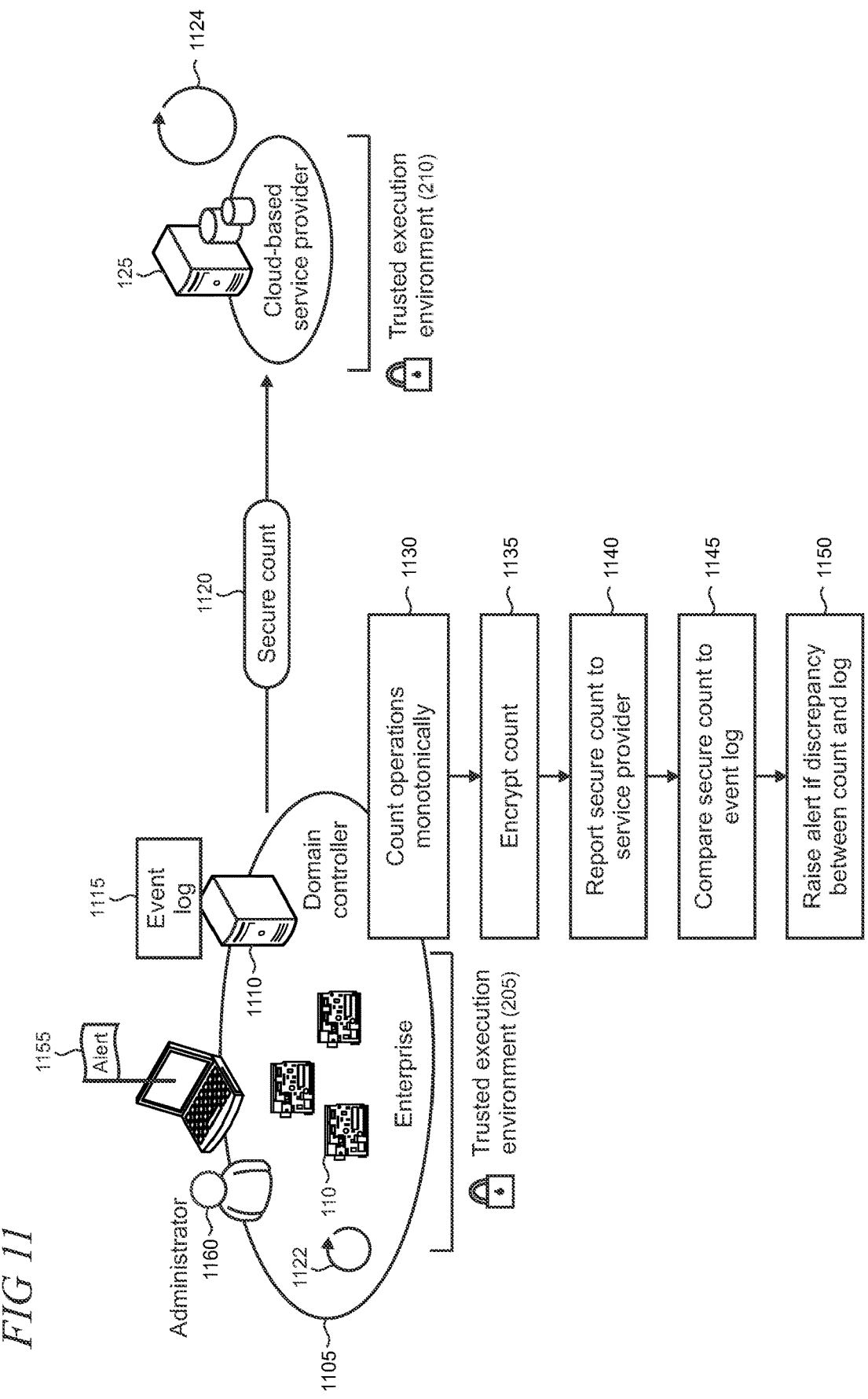
FIG. 11 shows an illustrative implementation of secure count to provide for verification of event logging on a computing device or group of devices.

The present secure count may be utilized for verification of event logging on a computing device or group of devices. FIG. 11 shows an illustrative example in which a group of IoT devices are deployed in an enterprise 1105. The computing devices in the enterprise can be associated with or managed by a common domain controller 1110 or another suitable device. The computing devices can be physically co-located or diversely located. The domain controller tracks events, such as the transmission of outgoing messages, occurring in the enterprise, which are stored in an event log 1115. In alternative implementations, the event logging can be performed for and by a single computing device.

The domain controller 1110 connects back to the cloud-based service provider 125 to provide a secure count 1120 of requests for operations. The service provider can compare the secure count against applicable license terms, as discussed above, to determine whether to enable continued operations (as indicated by reference numerals 1122 and 1124) or disable operations.

In this illustrative example, the domain controller 1110 performs the secure count 1120 by counting operations monotonically, for example upwards, as shown at block 1130. The count is encrypted at block 1135 and reported to the service provider 125 at block 1140. At block 1145, the secure count 1120 is compared to the event log 1115. As the secure counting is performed monotonically, correspondence between the secure count and the logged events in the enterprise 1105 is normally expected. Discrepancies between the secure count and event log can be analyzed to verify integrity of the computing devices 110 or the enterprise 1105. At block 1150, a mismatch between the monotonic secure count and event log can raise an alert 1155 to an administrator 1160. In alternative implementations the steps in blocks 1130-1150 may be performed by a trusted plug-in that runs on the domain controller 1110 or other computing device in the enterprise.

Figure 12:
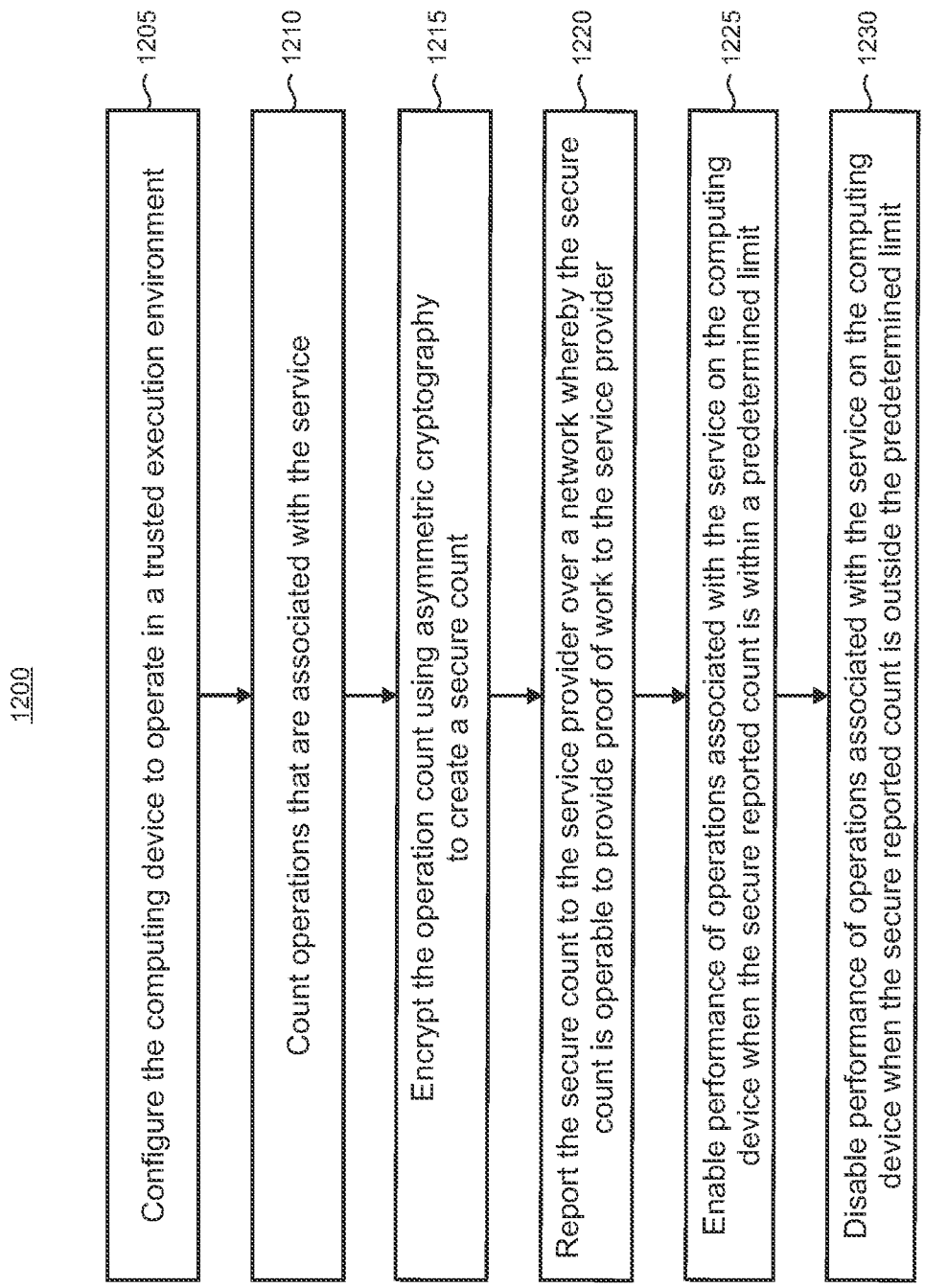
FIGS. 12, 13, and 14 are flowcharts of illustrative methods.

FIG. 12 is a flowchart of an illustrative method 1200 for operating a local computing device that has network connectivity to a service operated by a remote service provider. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1205, the computing device is configured to operate in a TEE. In step 1210, the computing device counts operations that are associated with the service. In step 1215, the operation count is encrypted using asymmetric cryptography to create a secure count. In step 1220, the secure count is reported to the service provider over a network whereby the secure count is operable to provide proof of work to the service provider. In step 1225, performance of operations associated with the service is enabled on the computing device when the reported secure count is within a predetermined limit. In step 1230, performance of operations associated with the service is disabled on the computing device when the reported secure count is outside the predetermined limit.

Figure 13:
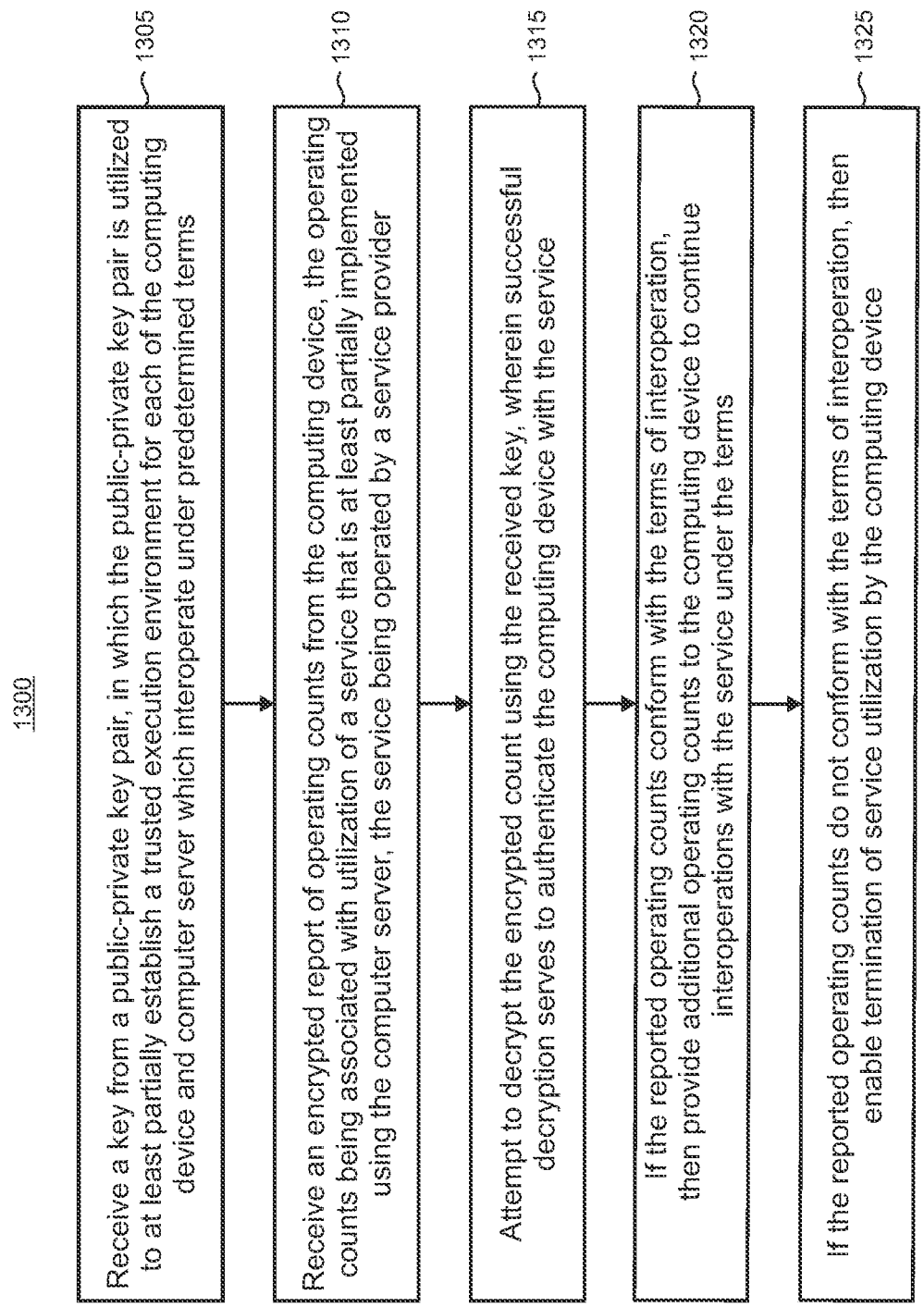

FIG. 13 is a flowchart of an illustrative method 1300 that may be performed by the cloud-based service provider 125 (FIG. 1). In step 1305, a key from a public-private key pair is received, in which the public-private key pair is utilized to at least partially establish a trusted execution environment for each of a computing device and computer server which interoperate under predetermined terms. In step 1310, an encrypted report of operating counts is received from the computing device, the operating counts being associated with utilization of a service that is at least partially implemented using the computer server, the service being operated by a service provider. In step 1315, the service provider attempts to decrypt the encrypted report of operating counts using the received key, wherein successful decryption serves to authenticate the computing device with the service. In step 1320, if the reported operating counts conform with the terms of interoperation, then additional operating counts are provided to the computing device to continue interoperations with the service under the terms. In step 1325, if the reported operating counts do not conform with the terms of interoperation, then the service provider enables termination of service utilization by the computing device. For example, the services are terminated if the service provider withholds tokens that are used to kick the watchdog.

Figure 14:
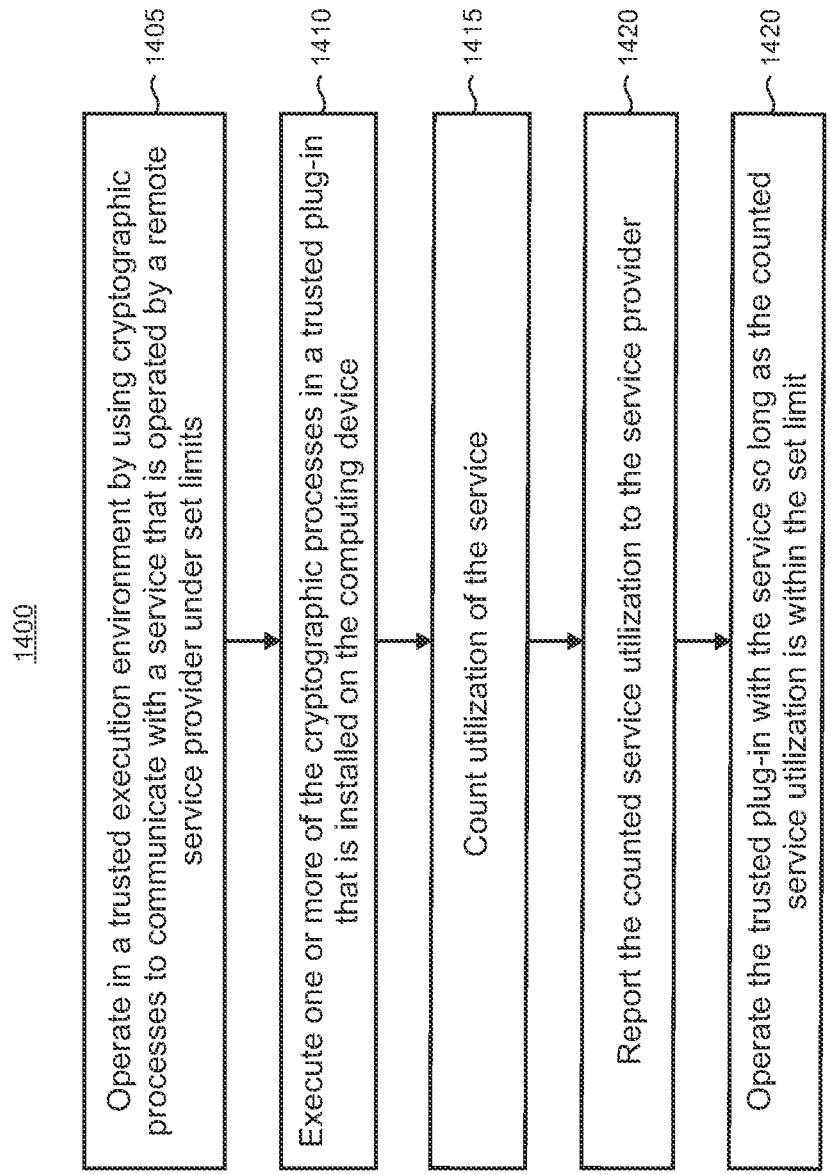

FIG. 14 is a flowchart of an illustrative method 1400 that may be performed by a computing device. In step 1405, the computing device operates in a trusted execution environment by using cryptographic processes to communicate with a service that is operated by a remote service provider under set limits. In step 1410, one or more of the cryptographic processes are executed in a trusted plug-in that is installed on the computing device. In step 1415, the computing device counts utilization of the service. In step 1420, the counted service utilization is reported to the service provider. In step 1425, the trusted plug-in is operated with the service so long as the counted service utilization is within the set limit.

Figure 15:
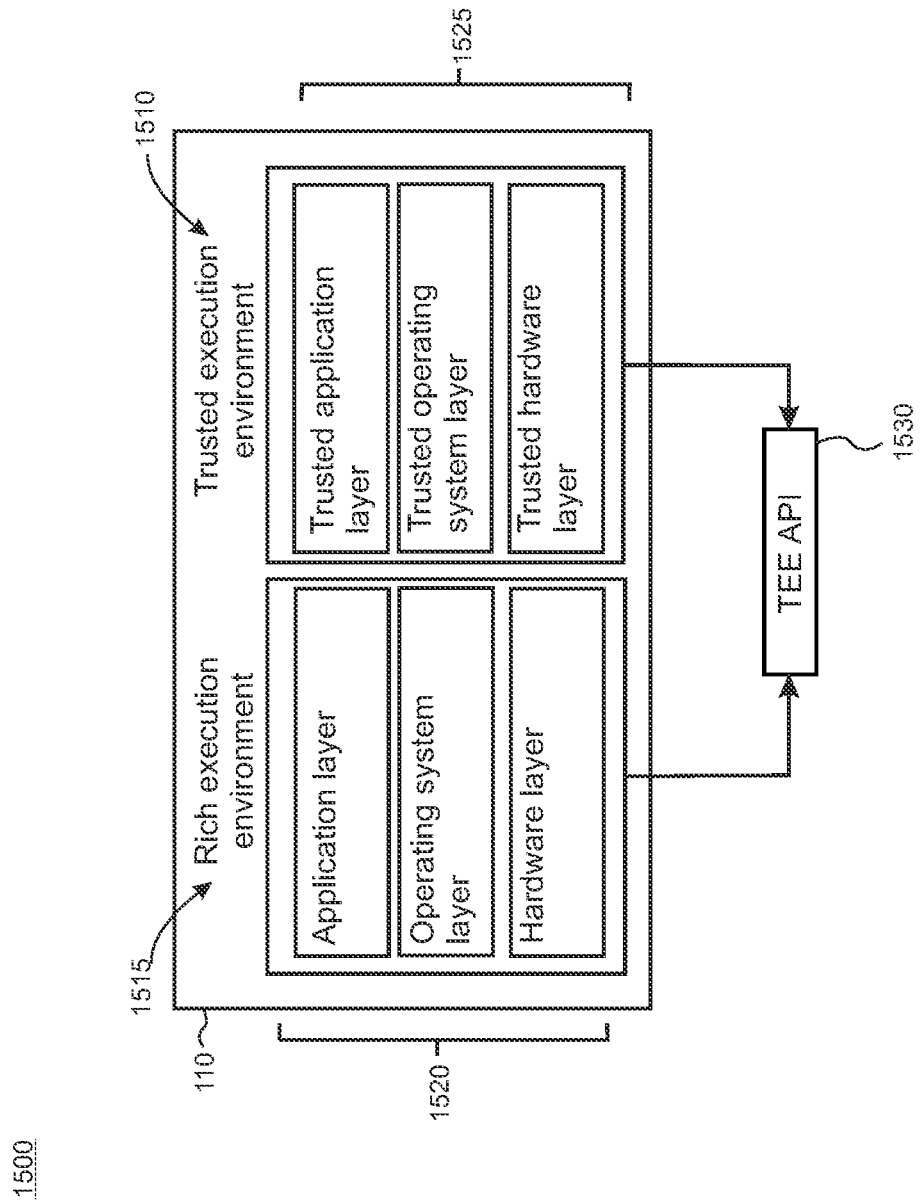
FIG. 15 shows an illustrative architecture with a rich execution environment (REE) and a trusted execution environment (TEE)

Illustrative details of the TEE are now presented. FIG. 15 shows an illustrative architecture 1500 of a computing device 110 having a rich execution environment (REE) (hereinafter referred to as a "public environment") 1515 running parallel to a TEE 1510. The public environment may be subjected to exposure and security risks. In contrast, the TEE may operate securely in isolation from the public environment to perform operations that are of a more sensitive nature from the public environment to perform operations that are of a more sensitive nature. Such sensitive operations can include, without limitation, the handling of confidential personal information, private data, medical data, banking and financial data, and the execution of financial transactions and control of systems such as critical infrastructure.

As illustratively shown, the public environment and the TEE include conventional computing configurations to perform various operations. In simplified form, the public environment and TEE each include application, operating system, and hardware layers (collectively represented by numerals 1520 and 1525), although the TEE is isolated and the hardware and software therein are considered trusted. The TEE and public environments can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized. For example, the TEE can be enforced using hardware so that malware that is attempted to be injected into the TEE via a buffer overrun cannot be executed by the secure processor, and any data inside the TEE cannot be read by code outside the TEE.

The application layers support various applications that are executable by the operating system. The public facing application layer can support applications such as a browser, messaging applications, and the like, whereas the application layer in the TEE can support, for example, trusted applications and plug-ins.

The operating system layers can manage system operations in which the hardware and application layers operate. In the public environment, the operating system (OS) can include Windows®, whereas the TEE can run a secure OS which runs parallel to the public OS. The OS layers can each support a TEE application programming interface (API) 1530 which provides the interoperability of the two environments. That is, a client TEE API in the public environment can be used to commence a session with the TEE and thereby allow the TEE to execute a trusted application.

The hardware layers support processors and memory. Although the public environment and TEE are illustratively shown as operating distinctly from each other, the various hardware components can be partitioned such that portions of the hardware are dedicated for only public operations, and portions of the hardware are dedicated for only trusted operations. This partitioning of the components and system provide the secure isolation offered by the TEE.

Figure 16:
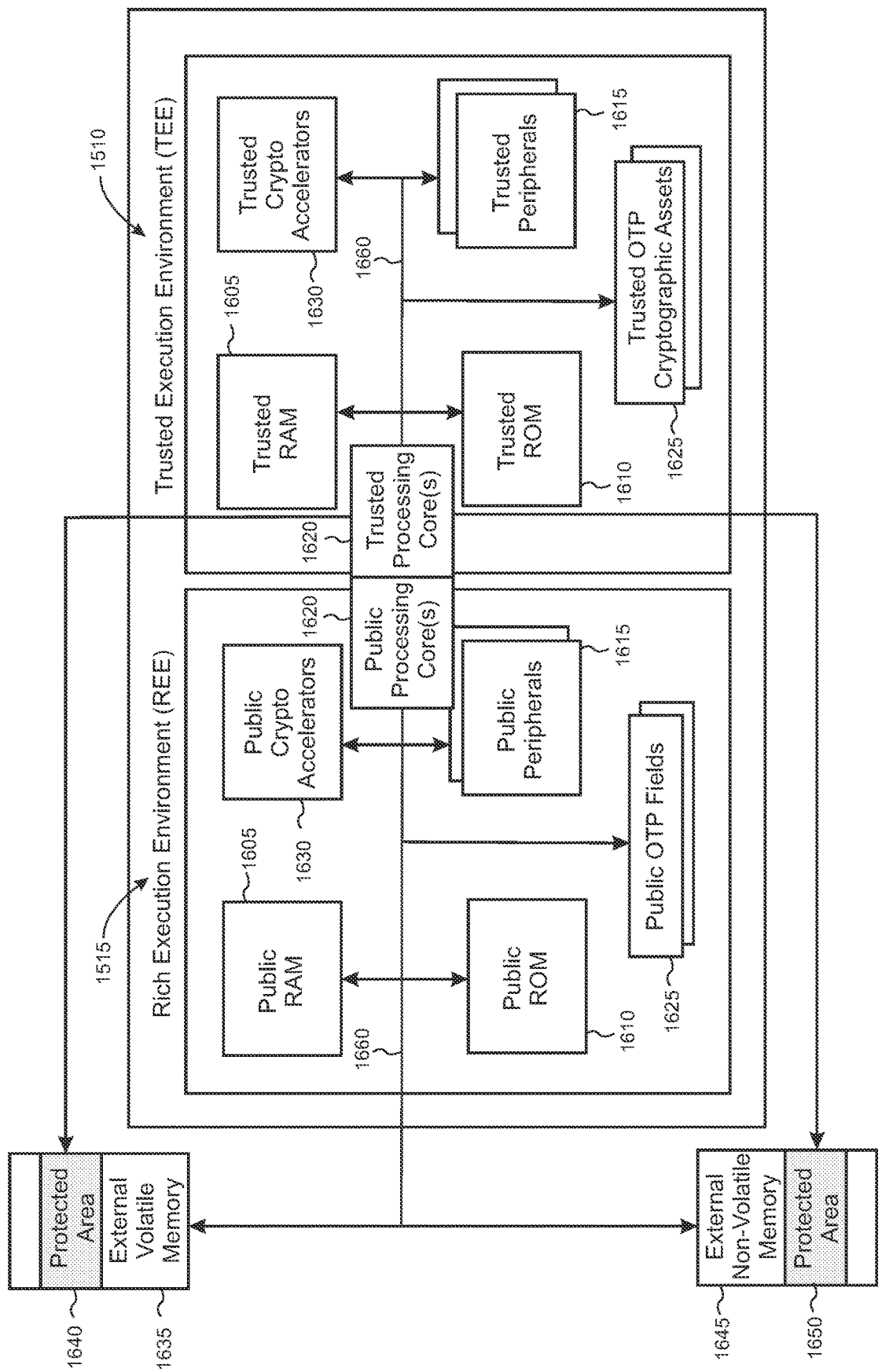
FIG. 16 shows an illustrative hardware architecture of a rich execution environment and a trusted execution environment.

FIG. 16 shows exemplary hardware of the computing device 110, which utilizes the public environment (i.e., rich execution environment 1515) and TEE 1510. As shown, the hardware components can be partitioned to isolate the TEE from the public environment. The public environment and TEE each include similar components which operate distinctly from the other environment. As illustratively shown, the various components include random access memory 1605, read-only memory 1610, peripherals 1615 (e.g., input/output devices), processing core(s) 1620, one-time password (OTP) fields 1625, and crypto accelerators 1630. In an illustrative example, the public environment can utilize external volatile memory 1635 and external non-volatile memory 1645, and a portion of the memories can have a protected area dedicated exclusively for the TEE, as representatively illustrated by numerals 1640 and 1650. The diagrams illustrated in FIGS. 15 and 16 are illustrative only, and other configurations that satisfy the secure environment offered by the TEE are also possible.

Figure 17:
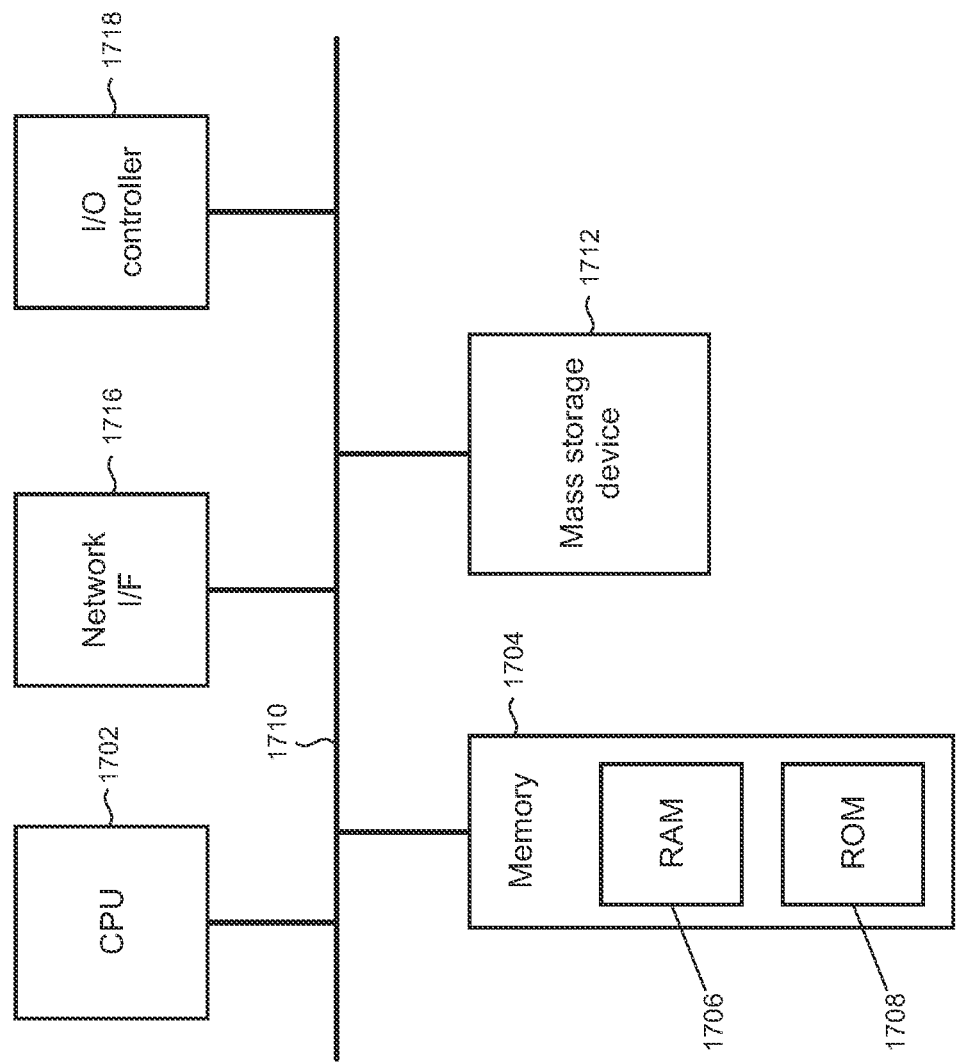
FIG. 17 is a block diagram of an illustrative computing device that may be used at least in part to implement the present secure count in cloud computing networks.

FIG. 17 shows an illustrative architecture 1700 for a device, such as a server, capable of executing the various components described herein for secure count in cloud computing networks. The architecture 1700 illustrated in FIG. 17 includes one or more processors 1702 (e.g., central processing unit, dedicated artificial intelligence chip, graphic processing unit, etc.), a system memory 1704, including RAM (random access memory) 1706 and ROM (read only memory) 1708, and a system bus 1710 that operatively and functionally couples the components in the architecture 1700. A basic input/output system containing the basic routines that help to transfer information between elements within the architecture 1700, such as during startup, is typically stored in the ROM 1708. The architecture 1700 further includes a mass storage device 1712 for storing software code or other computer-executed code that is utilized to implement applications, the file system, and the operating system. The mass storage device 1712 is connected to the processor 1702 through a mass storage controller (not shown) connected to the bus 1710. The mass storage device 1712 and its associated computer-readable storage media provide non-volatile storage for the architecture 1700. Although the description of computer-readable storage media contained herein refers to a mass storage device, such as a hard disk, solid state drive, or optical drive, it may be appreciated that computer-readable storage media can be any available storage media that can be accessed by the architecture 1700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1700.

According to various embodiments, the architecture 1700 may operate in a networked environment using logical connections to remote computers through a network. The architecture 1700 may connect to the network through a network interface unit 1716 connected to the bus 1710. It may be appreciated that the network interface unit 1716 also may be utilized to connect to other types of networks and remote computer systems. The architecture 1700 also may include an input/output controller 1718 for receiving and processing input from several other devices, including a keyboard, mouse, touchpad, touchscreen, control devices such as buttons and switches or electronic stylus (not shown in FIG. 17). Similarly, the input/output controller 1718 may provide output to a display screen, user interface, a printer, or other type of output device (also not shown in FIG. 17).

It may be appreciated that the software components described herein may, when loaded into the processor 1702 and executed, transform the processor 1702 and the overall architecture 1700 from a general-purpose computing system into a special-purpose computing system customized to facilitate the functionality presented herein. The processor 1702 may be constructed from any number of transistors or other discrete circuit elements, which may individually or collectively assume any number of states. More specifically, the processor 1702 may operate as a finite-state machine, in response to executable instructions contained within the software modules disclosed herein. These computer-executable instructions may transform the processor 1702 by specifying how the processor 1702 transitions between states, thereby transforming the transistors or other discrete hardware elements constituting the processor 1702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1700 in order to store and execute the software components presented herein. It also may be appreciated that the architecture 1700 may include other types of computing devices, including wearable devices, handheld computers, embedded computer systems, smartphones, PDAs, and other types of computing devices known to those skilled in the art. It is also contemplated that the architecture 1700 may not include all of the components shown in FIG. 17, may include other components that are not explicitly shown in FIG. 17, or may utilize an architecture completely different from that shown in FIG. 17.

Figure 18:
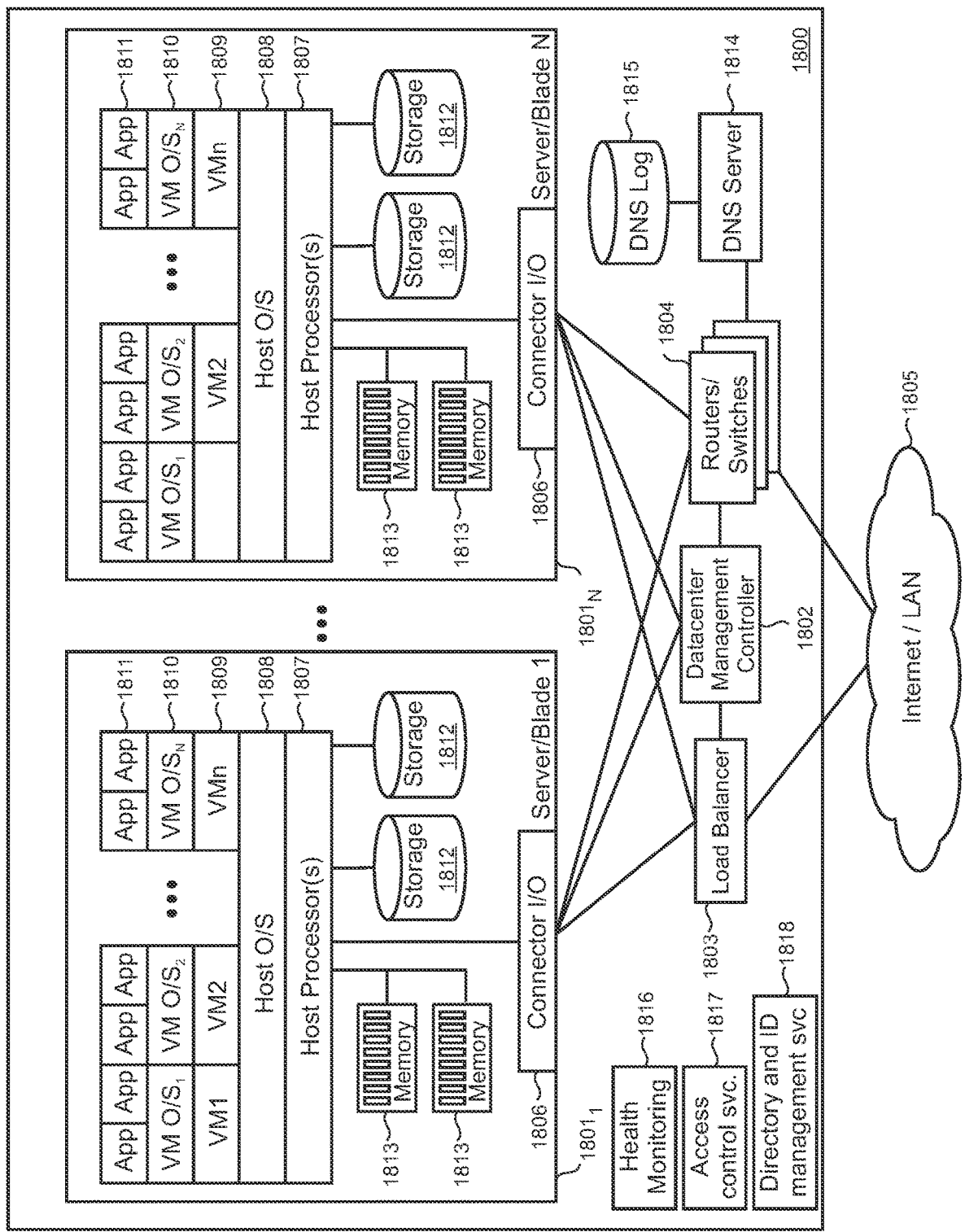
FIG. 18 is a block diagram of an illustrative datacenter that may be used at least in part to implement the present secure count in cloud computing networks.

FIG. 18 is a high-level block diagram of an illustrative datacenter 1800 that provides cloud computing services or distributed computing services that may be used to implement the present secure count in cloud computing networks. Datacenter 1800 may incorporate the features provided by the cloud-based service provider. A plurality of servers 1801 are managed by datacenter management controller 1802. Load balancer 1803 distributes requests and computing workloads over servers 1801 to avoid a situation wherein a single server may become overwhelmed. Load balancer 1803 maximizes available capacity and performance of the resources in datacenter 1800. Routers/switches 1804 support data traffic between servers 1801 and between datacenter 1800 and external resources and users (not shown) via an external network 1805, which may be, for example, a local area network (LAN) or the Internet.

Servers 1801 may be standalone computing devices, and/or they may be configured as individual blades in a rack of one or more server devices. Servers 1801 have an input/output (I/O) connector 1806 that manages communication with other database entities. One or more host processors 1807 on each server 1801 run a host operating system (O/S) 1808 that supports multiple virtual machines (VM) 1809. Each VM 1809 may run its own O/S so that each VM O/S 1810 on a server is different, or the same, or a mix of both. The VM O/Ss 1810 may be, for example, different versions of the same O/S (e.g., different VMs running different current and legacy versions of the Windows® operating system). In addition, or alternatively, the VM O/Ss 1810 may be provided by different manufacturers (e.g., some VMs running the Windows® operating system, while others VMs are running the Linux® operating system). Each VM 1809 may also run one or more applications (App) 1811. Each server 1801 also includes storage 1812 (e.g., hard disk drives (HDD)) and memory 1813 (e.g., RAM) that can be accessed and used by the host processors 1807 and VMs 1809 for storing software code, data, etc. In one embodiment, a VM 1809 may employ the data plane APIs as disclosed herein.

Datacenter 1800 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1800 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1809 on server 1801₁ to run their applications 1811. When demand for an application 1811 increases, the datacenter 1800 may activate additional VMs 1809 on the same server 1801₁ and/or on a new server 1801$_N$ as needed. These additional VMs 1809 can be deactivated if demand for the application later drops.

Datacenter 1800 may offer guaranteed availability, disaster recovery, and back-up services. For example, the datacenter may designate one VM 1809 on server 1801₁ as the primary location for the tenant's application and may activate a second VM 1809 on the same or different server as a standby or back-up in case the first VM or server 1801₁ fails. Datacenter management controller 1802 automatically shifts incoming user requests from the primary VM to the back-up VM without requiring tenant intervention. Although datacenter 1800 is illustrated as a single location, it will be understood that servers 1801 may be distributed to multiple locations across the globe to provide additional redundancy and disaster recovery capabilities. Additionally, datacenter 1800 may be an on-premises, private system that provides services to a single enterprise user or may be a publicly accessible, distributed system that provides services to multiple, unrelated customers and tenants or may be a combination of both.

Domain Name System (DNS) server 1814 resolves domain and host names into IP addresses for all roles, applications, and services in datacenter 1800. DNS log 1815 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 1816 monitors the health of the physical systems, software, and environment in datacenter 1800. Health monitoring 1816 provides feedback to datacenter managers when problems are detected with servers, blades, processors, or applications in datacenter 1800 or when network bandwidth or communications issues arise.

Access control service 1817 determines whether users can access particular connections and services on the datacenter 1800. Directory and identity management service 1818 authenticates user credentials for tenants on datacenter 1800.

Figure 19:
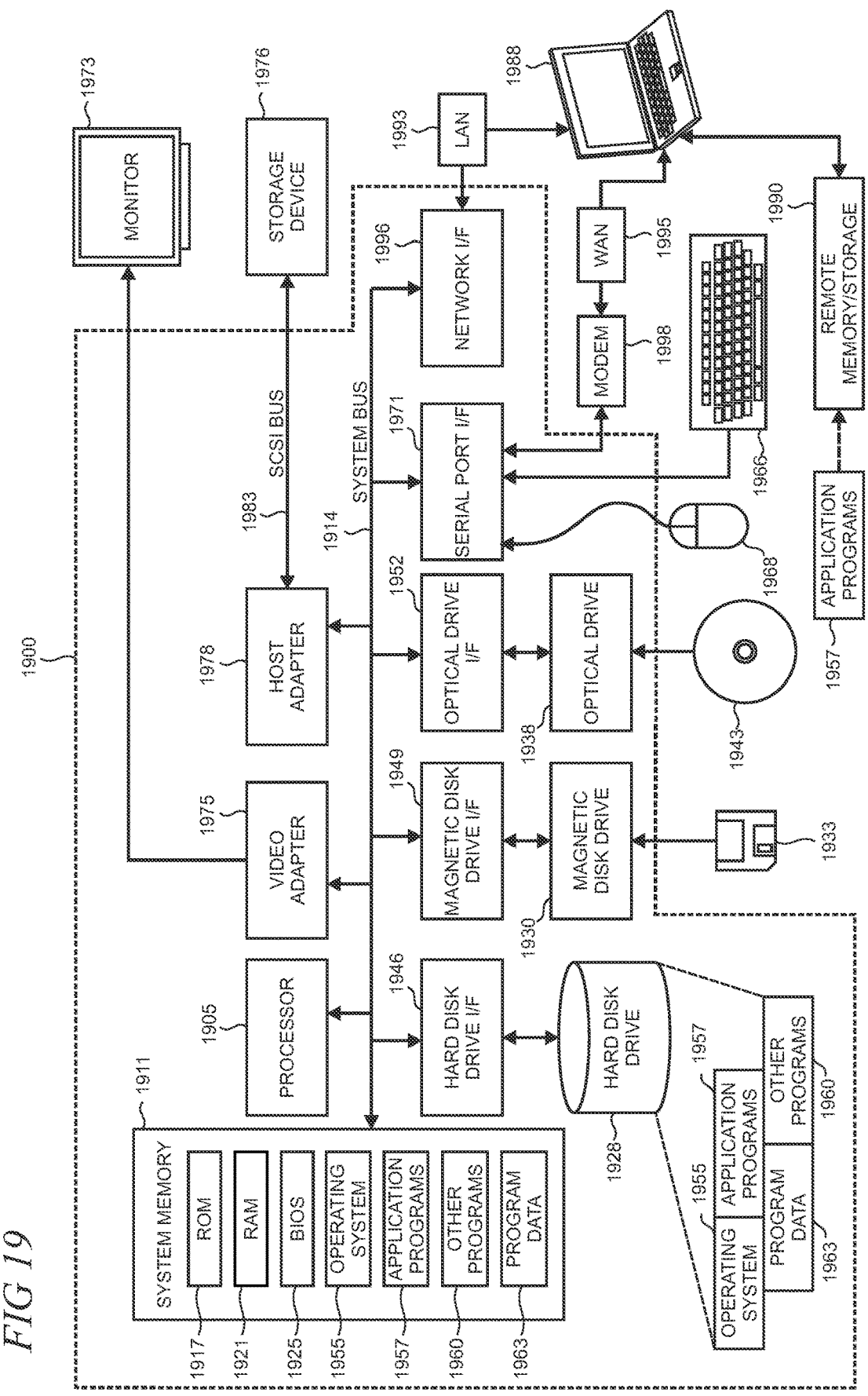
FIG. 19 is a simplified block diagram of an illustrative computing device that may be used at least in part to implement the present secure count in cloud computing networks.

FIG. 19 is a simplified block diagram of an illustrative computer system 1900 such as a PC, client machine, or server with which the present secure count in cloud computing networks may be implemented. Computer system 1900 includes a processor 1905, a system memory 1911, and a system bus 1914 that couple various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present secure count. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1933, optical disk 1943, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present secure count in cloud computing networks.

Various exemplary embodiments of the present secure count in cloud computing networks are now presented by way of illustration and not as an exhaustive list of all embodiments. An example includes a method for operating a local computing device that has network connectivity to a service operated by a remote service provider, comprising: configuring the computing device to operate in a trusted execution environment; counting operations that are associated with the service; encrypting the operation count using asymmetric cryptography to create a secure count; reporting the secure count to the service provider over a network whereby the secure count is operable to provide proof of work to the service provider; enabling performance of operations associated with the service on the computing device when the reported secure count is within a predetermined limit; and disabling performance of operations associated with the service on the computing device when the reported secure count is outside the predetermined limit.

In another example, the predetermined limit comprises an operations count that is defined by one of license, policy, or agreement. In another example, the proof of work is operable as an attestation by the computing device that the computing device is trustworthy by the service provider. In another example, the proof of work enables the service provider to recognize the computing device as being covered by a license or policy that is enforceable, at least in part, by the service provider. In another example, the secure count is implemented by counting up operations or counting down operations in association with one of pre-paid or post-paid license that is applicable to the computing device and service. In another example, the operations include one or more of remote operation by the service provider, the remote operation comprising data packet handling, virtual machine utilization, or function call to an application or service that is operable on one or more computer servers operated by the service provider. In another example, the operations are at least partially implemented by execution of local processing on the computing device. In another example, the computing device is operable under different configurations and further including reporting a secure count of operations for each of the different configurations. In another example, the method further includes providing a health certification to the service provider, the health certification including metadata that describes an operating state of the computing device at times associated with one or more of the counted operations. In another example, the method further includes throttling the counting or reporting so that the computing device is selectively disabled for predetermined time periods. In another example, the operations are enabled by kicking a watchdog that is instantiated on the computing device. In another example, a token received from the service provider is used to kick the watchdog. In another example, the operations are disabled by operations of a watchdog on the computing device. In another example, the counting is performed monotonically and further including comparing the monotonic count to an event log to identify mismatches between logged events and counted operations.

A further example includes one or more non-transitory computer readable memory devices storing computer-executable instructions which, upon execution by one or more processors in a computer server, cause the computer server to: receive a key from a public-private key pair, in which the public-private key pair is utilized to at least partially establish a trusted execution environment for each of a computing device and computer server which interoperate under predetermined terms; receive an encrypted report of operating counts from the computing device, the operating counts being associated with utilization of a service that is at least partially implemented using the computer server, the service being operated by a service provider; attempt to decrypt the encrypted report of operating counts using the received key, wherein successful decryption serves to authenticate the computing device with the service; if the reported operating counts conform with the terms of interoperation, then provide additional operating counts to the computing device to continue interoperations with the service under the terms; and if the reported operating counts do not conform with the terms of interoperation, then enable termination of service utilization by the computing device.

In another example, the instructions further cause the computer server to receive metadata that describes a state of the computing device when utilizing the service, and further filtering data exhaust from the computing device using the metadata. In another example, the instructions further cause the computer server to make resources available to the computing device to download or utilize, the availability being conditioned on receipt of operating count reporting from the computing device.

A further example includes a computing device, comprising: one or more processors; and at least one non-transitory computer-readable memory having computer-executable instructions stored thereon which, when executed by the one or more processors, cause the computing device to: operate in a trusted execution environment by using cryptographic processes to communicate with a service that is operated by a remote service provider under set limits; execute one or more of the cryptographic processes in a trusted plug-in that is installed on the computing device; count utilization of the service; report the counted service utilization to the service provider; and operate the trusted plug-in with the service so long as the counted service utilization is within the set limits.

In another example, the computing device further includes a trusted platform module (TPM) that stores one or more keys associated with cryptographic processes. In another example, the executed instructions further cause the computing device to operate the plug-in to run code associated with an application with the trusted execution environment, the plug-in providing isolation from an operating system and other applications and processes that execute on the computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A computing device, comprising:
   one or more processors; and
   at least one non-transitory computer-readable memory having computer-executable instructions stored thereon which, when executed by the one or more processors, cause the computing device to:
   execute, in a trusted execution environment, a cryptographic process in a trusted plug-in that is installed on the computing device, in which the trusted plug-in includes a watchdog;
   count utilization of a service;
   encrypt one or more messages using the cryptographic process;
   report the utilization of the service to a service provider using the one or more encrypted messages, wherein the service provider provides the service to the computing device; and
   responsively to the counted utilization of the service being outside predetermined limits, disable the trusted plug-in by operations of the watchdog.

2. The computing device of claim 1 further including a trusted platform module (TPM) that stores one or more keys associated with the cryptographic process.

3. The computing device of claim 1 in which the executed instructions cause the computing device to download code to the trusted plug-in and execute the downloaded code in the trusted plug-in.

4. The computing device of claim 3 in which the executed instructions cause the computing device to issue a certificate that the executed code is trusted.

5. The computing device of claim 1 in which the executed instructions cause the computing device to provide a health certification to the service provider, the health certification including metadata that describes an operating state of the computing device at times associated with utilization of the service.

6. The computing device of claim 1 in which the cryptographic process comprises asymmetric cryptography.

7. The computing device of claim 1 in which the trusted plug-in is configured to provide isolation from an operating system and other applications and processes that execute on the computing device.

8. One or more non-transitory computer-readable memory devices storing computer-executable instructions which, upon execution by one or more processors in a computing device, cause the computing device to:
  employ a trusted plug-in including a watchdog to implement a trusted execution environment by using a cryptographic process to encrypt one or more messages that are communicated to a service provider from the computing device;
  download code from the service provider, in which the downloaded code is encrypted;
  produce decrypted code by decrypting the code in the trusted plug-in;
  execute the decrypted code in the trusted plug-in; and
  responsively to remote performance of operations by the service provider being outside one of license, policy, or agreement, disable the trusted plug-in by operations of the watchdog.

9. The one or more non-transitory computer-readable memory devices of claim 8 in which the executable instructions further cause the computing device to count the remote performance of operations.

10. The one or more non-transitory computer-readable memory devices of claim 9 in which the executable instructions further cause the computing device to encrypt the count of the remote performance of operations to provide a secure count.

11. The one or more non-transitory computer-readable memory devices of claim 10 in which the executable instructions further cause the computing device to report the secure count to the service provider as proof of compliance with the one of license, policy, or agreement.

12. The one or more non-transitory computer-readable memory devices of claim 8 in which the trusted plug-in is configured to provide an attestation that the computing device was booted with trusted code.

13. The one or more non-transitory computer-readable memory devices of claim 8 in which the trusted plug-in is configured to review one of boot log or audit trail generated by a trusted platform module (TPM) to verify that the computing device executed code or handled data that is protected by the TPM.

14. The one or more non-transitory computer-readable memory devices of claim 8 in which the remote performance of operations comprises one of data packet handling, virtual machine utilization, or function call to an application or service that is operable on one or more computer servers operated by the service provider.

15. The one or more non-transitory computer-readable memory devices of claim 8 in which the trusted plug-in is configured to operate independently of an operating system that is instantiated on the computing device.

16. The one or more non-transitory computer-readable memory devices of claim 8 in which the executable instructions further cause the computing device to download the trusted plug-in from a service provider, in which the trusted plug-in includes the watchdog.

17. A method of operating a computer server on which a service operates, comprising:
  interoperating with a trusted plug-in that is installed on a computing device in accordance with predetermined terms, in which the trusted plug-in operates within a trusted execution environment by exchanging messages with the service that are encrypted by the trusted plug-in, and in which the trusted plug-in includes a watchdog that selectively disables the trusted plug-in based on operating counts, the operating counts being associated with utilization of the service by the computing device;
  receiving an encrypted report of the operating counts from the computing device; and
  discontinuing provision of additional operating counts to the watchdog in the trusted plug-in to cause the watchdog to disable the trusted plug-in responsively to the computing device being outside the predetermined terms.

18. The method of claim 17 further including authenticating the trusted plug-in by successfully decrypting the encrypted report of operating counts from the computing device.

19. The method of claim 17 further including receiving metadata that describes a state of the computing device when utilizing the service, and further filtering data exhaust from the computing device using the metadata.

20. The method of claim 17 further including making resources available to the computing device to download or utilize, the availability being conditioned on receipt of the operating count reporting from the computing device.

* * * * *